US012803333B2

(12) United States Patent
Ahn et al.

(10) Patent No.: US 12,803,333 B2
(45) Date of Patent: Nov. 17, 2026

(54) WIRELESS POWER TRANSMISSION APPARATUS, WIRELESS POWER RECEPTION APPARATUS, AND WIRELESS POWER TRANSMISSION SYSTEM USING AUXILIARY COIL

(71) Applicant: Korea Advanced Institute of Science and Technology, Daejeon (KR)

(72) Inventors: Seungyoung Ahn, Daejeon (KR); Jedok Kim, Daejeon (KR); Jangyong Ahn, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 797 days.

(21) Appl. No.: 18/313,432

(22) Filed: May 8, 2023

(65) Prior Publication Data

US 2023/0275466 A1 Aug. 31, 2023

Related U.S. Application Data

(63) Continuation of application No. PCT/KR2022/005816, filed on Apr. 22, 2022.

(30) Foreign Application Priority Data

Apr. 22, 2021 (KR) ........................ 10-2021-0052508
Apr. 22, 2022 (KR) ........................ 10-2022-0050221

(51) Int. Cl.
*H02J 50/12* (2016.01)
*H02J 50/00* (2016.01)
(Continued)

(52) U.S. Cl.
CPC ............ *H02J 50/12* (2016.02); *H02J 50/005* (2020.01); *H02J 50/402* (2020.01); *H01F 38/14* (2013.01)

(58) Field of Classification Search
CPC ........ H02J 50/12; H02J 50/005; H02J 50/402; H02J 50/00; H02J 50/10; H02J 50/70;
(Continued)

(56) References Cited

U.S. PATENT DOCUMENTS

2003/0134612 A1* 7/2003 Nakayama .......... H01F 17/0013 455/306
2014/0292471 A1* 10/2014 Ho ........................ H01F 27/385 336/84 C (Continued)

FOREIGN PATENT DOCUMENTS

JP 6399351 B2 * 10/2018
JP 6414650 B2 10/2018
(Continued)

OTHER PUBLICATIONS

Office Action for Korean Application No. 10-2022-0050221 dated Apr. 22, 2022 with English translation.

*Primary Examiner* — Shawki S Ismail
*Assistant Examiner* — Kazi S Hossain
(74) *Attorney, Agent, or Firm* — NKL LAW; Jae Youn Kim

(57) ABSTRACT

A wireless power transmission apparatus comprises a feeding coil configured to be wound a plurality of times with respect to a center, generate a time-varying magnetic field according to operating frequency of a supply power, and wirelessly transmit an electrical energy to a collecting coil exposed to the time-varying magnetic field through magnetic inductive coupling; and a feeding auxiliary coil configured to be wound along with the feeding coil a plurality of times with respect to the same center as the feeding coil, generate an auxiliary magnetic field with a phase that affects the feeding coil, and provide additional inductance generated by the auxiliary magnetic field.

15 Claims, 19 Drawing Sheets

(51) Int. Cl.
*H02J 50/40* (2016.01)
*H01F 38/14* (2006.01)

(58) Field of Classification Search
CPC ........ H01F 38/14; H01F 27/289; H01F 27/38; Y02T 10/70; Y02T 10/7072; Y02T 90/14
USPC .......................................... 336/200, 232, 198
See application file for complete search history.

(56) References Cited

U.S. PATENT DOCUMENTS

| | | | | |
|---|---|---|---|---|
| 2016/0284465 | A1* | 9/2016 | Maniktala | H02J 50/12 |
| 2018/0174737 | A1* | 6/2018 | Song | H01F 27/24 |
| 2019/0074719 | A1 | 3/2019 | Wittenberg et al. | |

FOREIGN PATENT DOCUMENTS

| | | | | | |
|---|---|---|---|---|---|
| KR | 10-2018-0132205 | A | | 12/2018 | |
| KR | 20180132205 | A | * | 12/2018 | H01F 27/365 |
| KR | 102004445 | B1 | * | 7/2019 | B60L 53/38 |

* cited by examiner

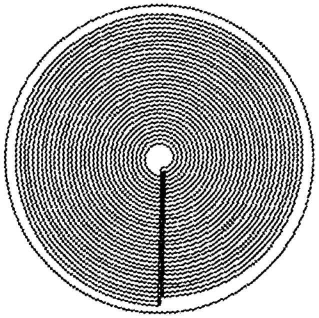

30-TURN COIL

- L: 239.7 uH
- Turns :30
- R: 200 mΩ
- Size : 300 mm $$Q_{ix} = \frac{\omega L_{ix}}{R_{ix}}$$

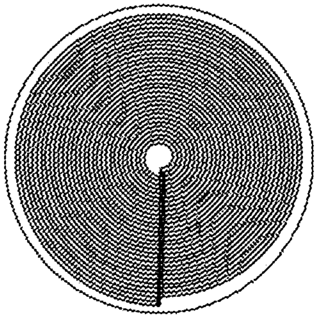

15-TURN COIL

- L1: 62.6 uH
- L2: 59.5 uH
- M: 61 uH
- Turns :15 (each)
- R: 100 mΩ (each)
- Size : 300 mm $$Q_{ix} = \frac{\omega\left(\frac{L_{ix}}{4} + M_{ixis}\left(\frac{I_{is}}{I_{ix}}\right)\right)}{R_{ix}/2}$$

| | $L_{TX}, L_{RX}$ [μH] | $L_{TS}, L_{TS}$ [μH] | $C_{TX}, C_{TX}$ [nF] | $C_{TC}, C_{RC}$ [nF] | $R_{TX}, R_{RX}$ [mΩ] | $R_{TC}, R_{RC}$ [mΩ] |
|---|---|---|---|---|---|---|
| 30-TURN COIL | 239.7 | – | 14.62 | – | 200 | – |
| 15-TURN COIL | 62.6 | 59.5 | 28.5 | 29.48 | 100 | 100 |

| | $Q_{TX}$ | $Q_{RX}$ | $k_{max-T}$ |
|---|---|---|---|
| 30-TURN COIL | 182.88 | 11.96 | 0.021 |
| 15-TURN COIL | 55.72 | 3.14 | 0.075 |

30-TURN COIL
$Q_{TX} = 182.88$
$Q_{RX} = 11.96$
$k_{max-T} = 0.021$

15-TURN COIL
$Q_{TX} = 55.72$
$Q_{RX} = 3.14$
$k_{max-T} = 0.075$

FIG. 13

WIRELESS POWER TRANSMISSION APPARATUS, WIRELESS POWER RECEPTION APPARATUS, AND WIRELESS POWER TRANSMISSION SYSTEM USING AUXILIARY COIL

This work was supported by Institute of Information & communications Technology Planning & Evaluation (IITP) grant funded by the Korea government (MSIT) (No. 2020-0-00839, Development of Advanced Power and Signal EMC Technologies for Hyper-connected E-Vehicle), and Basic Science Research Program through the National Research Foundation Korea (NRF) funded by the Ministry of Science and ICT (No. NRF- 2017R1A5A1015596).

TECHNICAL FIELD

The present disclosure relates to a wireless power transmission apparatus using an auxiliary coil, a wireless power reception apparatus corresponding thereto, and a wireless power transmission system including the wireless power transmission apparatus and the wireless power reception apparatus.

BACKGROUND

In recent years, applications of wireless power transmission technology to apparatuses requiring charging of electric energy, such as portable electronic apparatuses and electric vehicles, are increasing. This wireless power transmission technology is used for the purpose of convenience of charging for consumer electronics such as mobile phones and electric apparatuses that require charging such as electric vehicles.

A wireless power transmission system is basically composed of a feeding coil and a collecting coil. When power is supplied to the feeding coil, a current is flowed in the feeding coil, and as the current is flow in the feeding coil, a feeding magnetic field is produced. The feeding magnetic field produced from the feeding coil is excited in the collecting coil, and the feeding coil and the collecting coil are inductively coupled circuits through the magnetic field, enabling wireless transmission of electrical energy without direct contact with the conductor.

However, there is a problem that power loss inevitably occurs due to internal resistance in the power supply coil and the collecting coil constituting such a wireless power transmission system.

In order to solve the loss of the wireless power transmission system, there is a method of improving the wireless power transmission quality factor by increasing the number of turns of the coil, but as the number of turns of the coil increases, because not only the inductance of the coil, the internal resistance of the coil also increases at the same time, there is a limit to effectively increasing the quality factor without increasing the internal resistance.

In addition, if a shielding apparatus is applied to reduce a leakage magnetic field generated during a wireless power transmission operation, the effective inductance of the coil by the shielding apparatus is reduced, and thus the quality factor is reduced. In this case, since a decrease in the efficiency of the wireless power transmission system due to the shielding apparatus, there is a restriction in the application of the shielding apparatus for reducing the leakage magnetic field.

SUMMARY

According to an embodiment, there is provided a wireless power transmission apparatus in which inductance and quality factor are improved without increasing the number of turns of the feeding coil by using the feeding auxiliary coil.

According to another embodiment, there is provided a wireless power reception apparatus in which inductance and quality factor are improved without increasing the number of turns of the collecting coil by using the current collecting auxiliary coil.

According to another embodiment, there is provided a wireless power transmission system in which inductance and quality factors are improved without increasing the number of turns of the current feeding coil and the collecting coil by using the feeding auxiliary coil and the current collecting auxiliary coil.

However, the technical problems to be achieved by the embodiments of the present disclosure are not limited to the above-mentioned problems, and various technical problems can be derived from the contents to be described below within the scope obvious to those skilled in the art.

In accordance with an aspect of the present disclosure, there is provided a wireless power transmission apparatus, the wireless power transmission apparatus may comprise a feeding coil configured to be wound a plurality of times with respect to a center, generate a time-varying magnetic field according to operating frequency of a supply power, and wirelessly transmit an electrical energy to a collecting coil exposed to the time-varying magnetic field through magnetic inductive coupling; and a feeding auxiliary coil configured to be wound along with the feeding coil a plurality of times with respect to the same center as the feeding coil, generate an auxiliary magnetic field with a phase that affects the feeding coil, and provide additional inductance generated by the auxiliary magnetic field.

In accordance with another aspect of the present disclosure, there is provided a wireless power reception apparatus, the apparatus may comprise: a collecting coil configured to be wound a plurality of times with respect to a center and receive electrical energy wirelessly through magnetic inductive coupling when exposed to a time-varying magnetic field generated by a feeding coil according to operating frequency of a supply power; and a collecting auxiliary coil configured to be wound along with the collecting coil a plurality of times with respect to the same center as the collecting coil, generate a auxiliary magnetic field with a phase that affects the collecting coil, and provide additional inductance generated by the auxiliary magnetic field.

In accordance with another aspect of the present disclosure, there is provided a wireless power transmission system, the system may comprise: a feeding apparatus configured to be wirelessly transmitted an electrical energy through magnetic inductive coupling; and a current collecting apparatus configured to receive the electrical energy wirelessly through the magnetic inductive coupling. The feeding apparatus may comprise: a feeding coil is configured to be wound a plurality of times with respect to a center, generate a time-varying magnetic field according to operating frequency of a supply power, and wirelessly transmit an electrical energy to a collecting coil exposed to the time-varying magnetic field through magnetic inductive coupling; and a feeding auxiliary coil configured to be wound along with the feeding coil a plurality of times with respect to the same center as the feeding coil, generate an auxiliary magnetic field with a phase that affects the feeding coil, and provide additional inductance generated by the auxiliary magnetic field. The current collecting apparatus may comprise: a collecting coil configured to be wound a plurality of times with respect to a center and receives electrical energy wirelessly through magnetic inductive coupling when exposed to a time-varying magnetic field generated by a feeding coil according to operating frequency of a supply power; and a collecting auxiliary coil configured to be wound along with the collecting coil a plurality of times with respect to the same center as the collecting coil, generate a auxiliary magnetic field with a phase that affects the collecting coil, and provide additional inductance generated by the auxiliary magnetic field.

According to the embodiment, by configuring the feeding coil and the feeding auxiliary coil generating a magnetic field having the in-phase or out-of-phase with respect to a magnetic field generated by the feeding coil to be adjacent to each other so that the mutual inductance by the feeding auxiliary coil acts as an additional inductance for the feeding coil, inductance and quality factor can be controlled to increase or decrease without a change in the number of turns of the feeding coil.

According to another embodiment, by configuring the collecting coil and the current collecting auxiliary coil generating a magnetic field having the in-phase or out-of-phase with respect to a magnetic field generated by the feeding coil to be adjacent to each other so that the mutual inductance by the current collecting auxiliary coil acts as an additional inductance for the collecting coil, inductance and quality factor can be controlled to increase or decrease without a change in the number of turns of the collecting coil.

According to another embodiment, by configuring the feeding coil and the feeding auxiliary coil generating a magnetic field having the in-phase or out-of-phase with respect to a magnetic field generated by the feeding coil to be adjacent to each other, and by configuring the collecting coil and the current collecting auxiliary coil generating a magnetic field having the in-phase or out-of-phase with respect to a magnetic field generated by the collecting coil to be adjacent to each other, so that the mutual inductance by the feeding auxiliary coil and the current collecting auxiliary coil act as an additional inductance for the feeding coil and the collecting coil, the inductance and the quality factor can be controlled to increase or decrease without a change in the number of turns of the feeding coil and the collecting coil.

Accordingly, by intensively generating the increase or decrease of the inductance with little increase in the internal resistance due to the increase in the number of turns of the feeding coil and/or the collecting coil, the quality factor determined by the size of the inductance with respect to the internal resistance can be effectively controlled, thereby it is possible to achieve an improvement in the efficiency of wireless power transmission.

In addition, by applying a feeding shielding coil and/or a current collecting shielding coil positioned to be spaced apart from the outer portion of the structure formed by the collecting coil and the current collecting auxiliary coil, there is an effect that transmission efficiency does not decrease by allowing the leakage magnetic field to be shielded without reduction in the effective inductance.

BRIEF DESCRIPTION OF THE DRAWINGS

FIG. 13 is an exemplary diagram of simulation conditions applied to a primary coil having the number of turns of 30 turns, and simulation conditions applied to a primary coil having the number of turns of 15 turns and an auxiliary coil having the number of turns of 15 turns.

DETAILED DESCRIPTION

Figure 1:
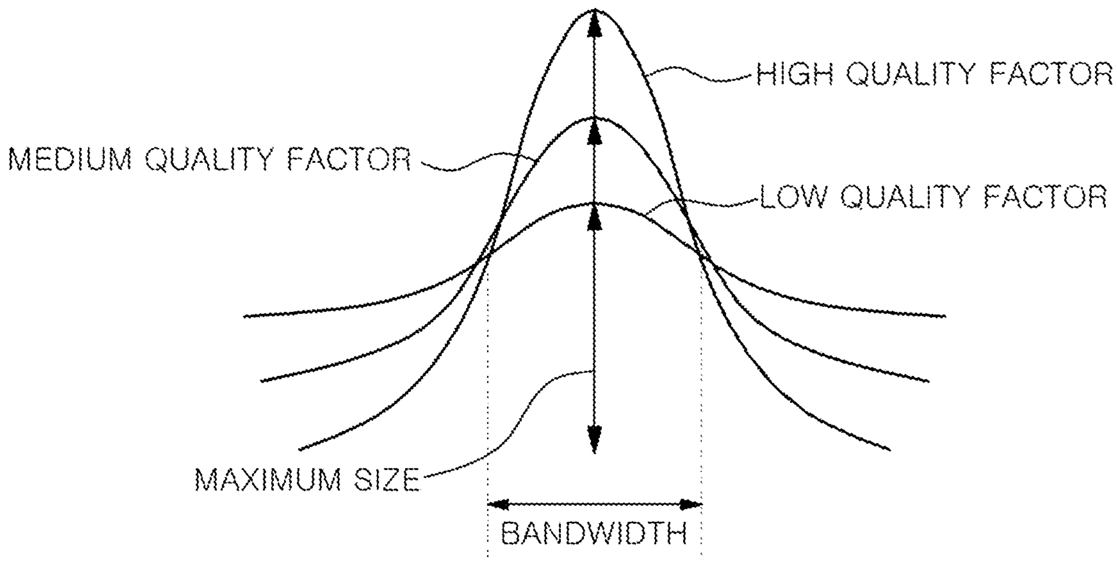
FIG. 1 is an exemplary diagram illustrating a bandwidth and a maximum value according to various quality factors of a wireless power transmission system.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

In the embodiment of the present disclosure, a term of in-phase represents that a phase difference of two magnetic fields, two currents, or two voltages is larger than or equal to 0° and less than 90° and a term of out-of-phase represents that the phase difference is larger than 90° and less than or equal to 180°.

Figure 3:
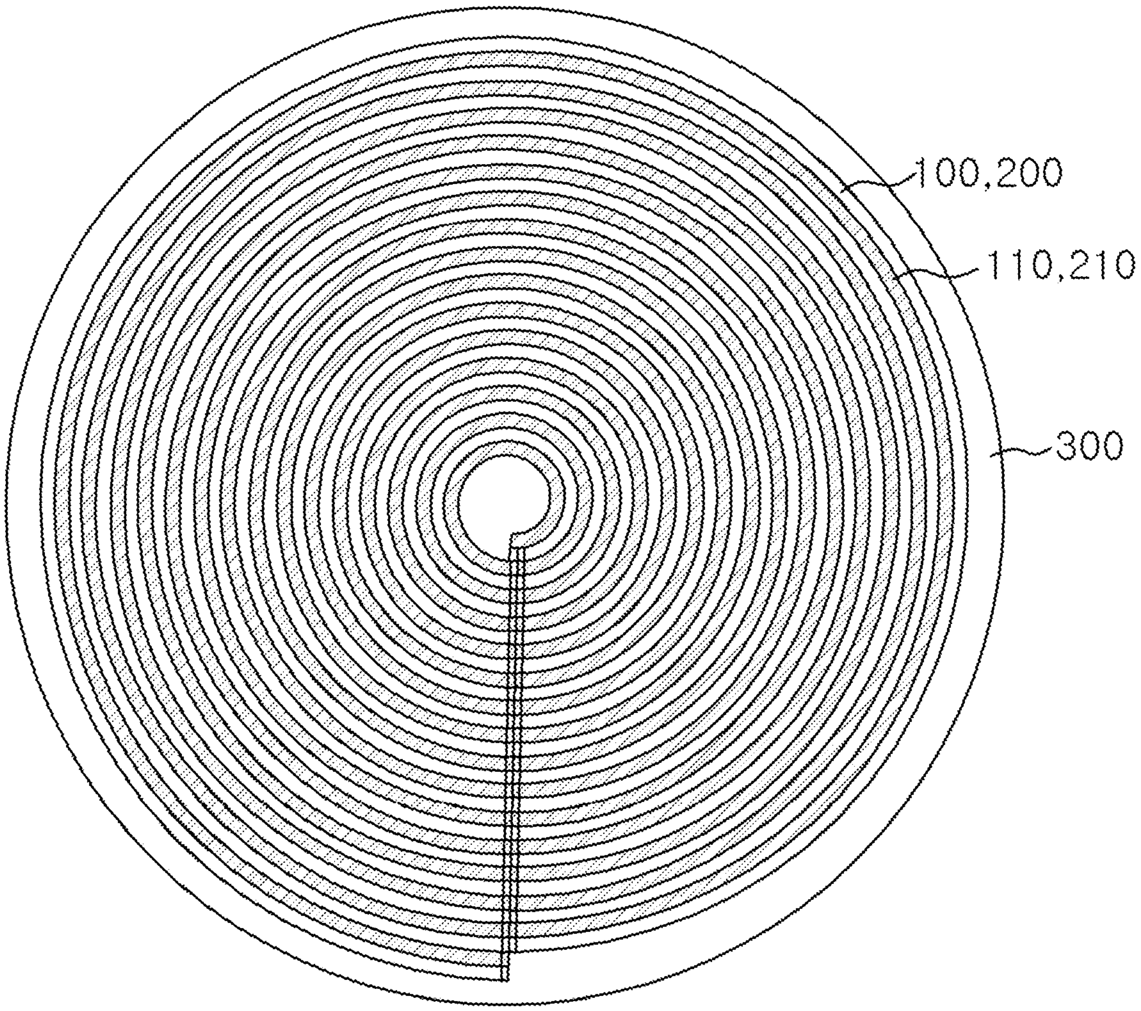
FIGS. 3 and 4 are exemplary diagrams of a wireless power transmission apparatus and a wireless power reception apparatus constituting a wireless power transmission system according to an embodiment of the present disclosure.
Figure 4:
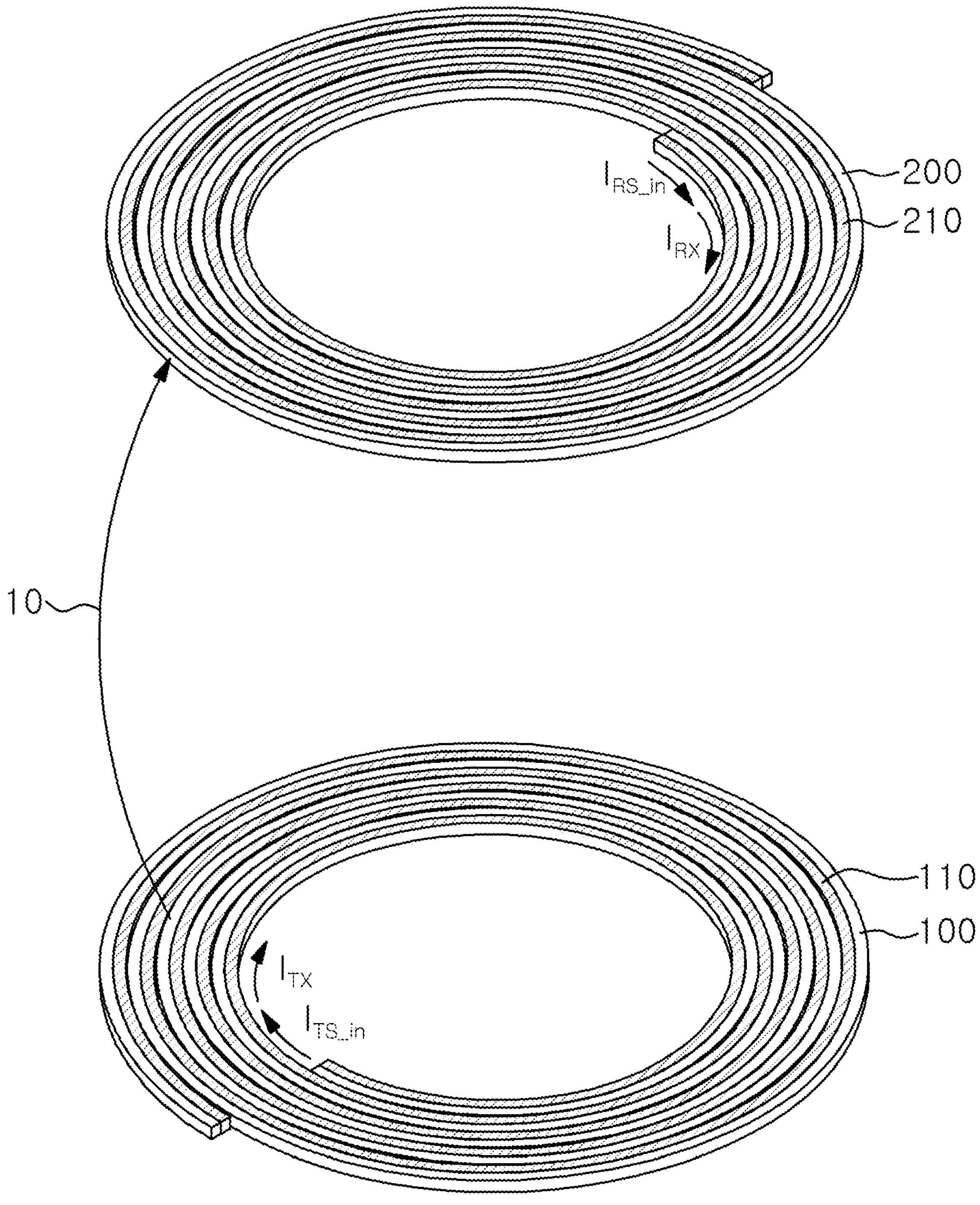
Figure 7:
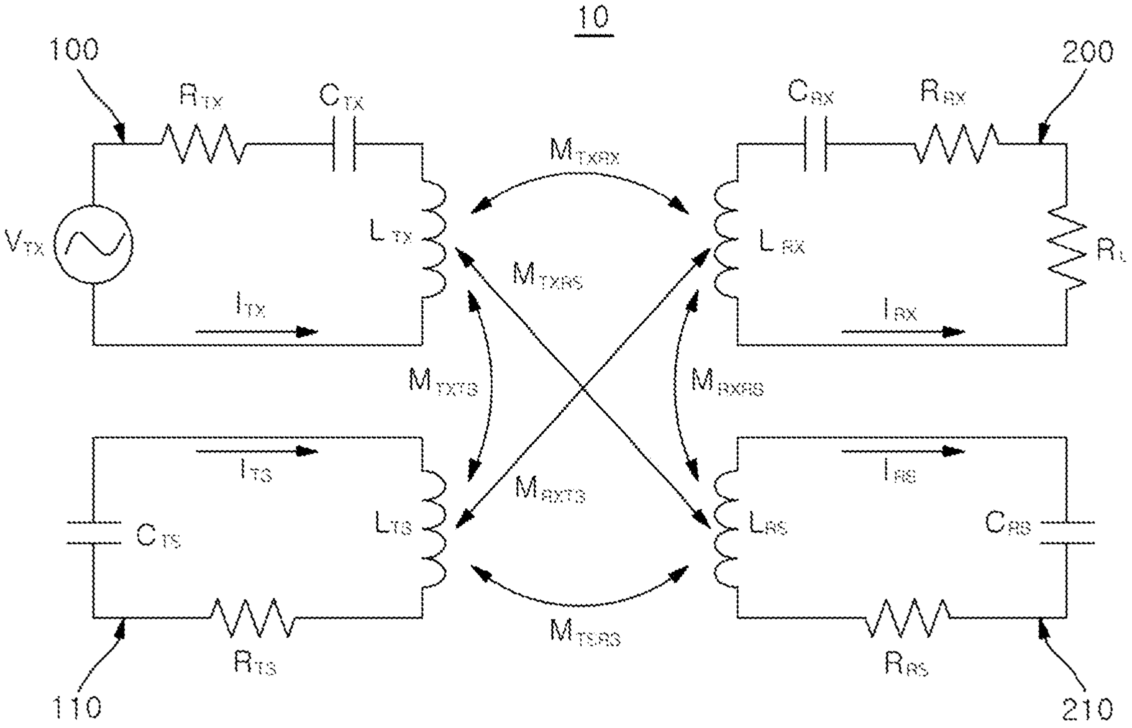
FIG. 7 is an equivalent circuit diagram of the wireless power transmission system according to the embodiment of the present disclosure.

FIGS. 3 and 4 are exemplary diagrams of a wireless power transmission apparatus and a wireless power reception apparatus constituting the wireless power transmission system 10 according to an embodiment of the present disclosure, and FIG. 7 is an equivalent circuit diagram of the power transmission system 10 according to an embodiment of the present disclosure.

The wireless power transmission apparatus includes a feeding coil 100 and a feeding auxiliary coil 110. The feeding coil 100 is wound a plurality of times with respect to a center, with a time-varying magnetic field being generated according to the operating frequency of the supply power, and wirelessly transmits electrical energy to the collecting coil 200 of the wireless power reception apparatus exposed to the time-varying magnetic field through magnetic inductive coupling. The feeding auxiliary coil 110 has the same center with the feeding coil 100 and is wound together with the feeding coil 100 a plurality of times, and generates a magnetic field of a phase that affects the feeding coil 100 to provide additional inductance.

Here, the feeding coil 100 and the feeding auxiliary coil 110 may generate a magnetic field. A magnetic field generated by the feeding coil 100 and a magnetic field generated by the feeding auxiliary coil 110 may be a condition of in-phase or out-of-phase.

The additional inductance provided by the auxiliary feeding coil 110 may increase as the ratio of the current flowing through the auxiliary feeding coil 110 to the current flowing through the feeding coil 100 increases.

In addition, the feeding coil 100 and the feeding auxiliary coil 110 may be wound together with the same center in close contact with each other in a physically insulated state by their respective outer shells. The feeding coil 100 and the feeding auxiliary coil 110 may be positioned horizontally to each other at the same height based on a virtual central axis located at the same center, and the feeding coil 100 and the feeding auxiliary coil 110 may have different radii for each number of times they are wound with the same center. The number of turns of the feeding coil 100 and the auxiliary feeding coil 110 may be the same, or the number of turns of one of the coils may be greater. As the number of turns of the feeding auxiliary coil 110 is greater than the number of turns of the feeding coil 100, the effect of the magnetic field of the feeding auxiliary coil 110 on the feeding coil 100 increases, so that the quality factor of the feeding coil 100 is also increased. In the description below, for economical comparison and effectiveness comparison of the wireless power transmission apparatus in which the feeding auxiliary coil 110 does not exist and the wireless power transmission apparatus in which the feeding auxiliary coil 110 exists, the feeding coil 100 and the feeding auxiliary coil 110 may be described with respect to an embodiment having the same number of turns, but it is not limited thereto.

In FIGS. 3 and 4, the feeding coil 100 and the feeding auxiliary coil 110 are shown for an embodiment positioned adjacent to the horizontal direction, but an embodiment can be considered that the feeding coil 100 and the feeding auxiliary coil 110 are positioned adjacent to the vertical direction. The feeding coil 100 and the feeding auxiliary coil 110 may be located at different heights based on a virtual central axis located at the same center, and may have the same radius for each number of turns with the same center.

The wireless power reception apparatus includes a collecting coil 200 and a current collecting auxiliary coil 210. The collecting coil 200 is wound a plurality of times with respect to the center, and if exposed to a time-varying magnetic field generated by the feeding coil 100 according to an operating frequency of the supply power, electric energy is wirelessly transmitted through magnetic inductive coupling. The current collecting auxiliary coil 210 is wound with the collecting coil 200 a plurality of times with the same center as the collecting coil 200, and generates a magnetic field of a phase that affects the collecting coil 200 to provide additional inductance.

Here, the collecting coil 200 and the current collecting auxiliary coil 210 may generate a magnetic field. A magnetic field generated by the collecting coil 200 and a magnetic field generated by the current collecting auxiliary coil 210 may be a condition of in-phase or out-of-phase. The additional inductance provided by the current collecting auxiliary coil 210 may increase as the ratio of the current flowing through the current collecting auxiliary coil 210 to the current flowing through the collecting coil 200 increases.

In addition, the collecting coil 200 and the current collecting auxiliary coil 210 are in close contact with each other in a physically insulated state by their respective outer shells and may be wound together with the same center. The collecting coil 200 and the current collecting auxiliary coil 210 may be positioned horizontally to each other at the same height based on a virtual central axis located at the same center, and the collecting coil 200 and the current collecting auxiliary coil 210 may have different radii for each number of times it is wound with respect to the same center. The number of turns of the collecting coil 200 and the current collecting auxiliary coil 210 may be the same, or the number of turns of one of the coils may be greater. As the number of turns of the current collecting auxiliary coil 210 is greater than the number of turns of the collecting coil 200, the effect of the magnetic field of the current collecting auxiliary coil 210 on the collecting coil 200 increases, so that the quality factor of the collecting coil 200 is also increased. In the description below, for economical comparison and effectiveness comparison of the wireless power transmission apparatus in which the current collecting auxiliary coil 210 does not exist and the wireless power transmission apparatus in which the current collecting auxiliary coil 210 exists, the collecting coil 200 and the current collecting auxiliary coil 210 may be described with respect to an embodiment having the same number of turns, but it is not limited thereto.

FIGS. 3 and 4 show an embodiment in which the collecting coil 200 and the current collecting auxiliary coil 210 are located adjacent to each other in the horizontal direction, but an embodiment can be considered where the collecting coil 200 and the current collecting auxiliary coil 210 are located adjacent to the vertical direction. The collecting coil 200 and the current collecting auxiliary coil 210 may be located at different heights based on a virtual central axis located at the same center, and may have the same radius for each number of times they are wound with the same center. In FIG. 3, the reference numeral 30 denotes ferrite.

Figure 11:
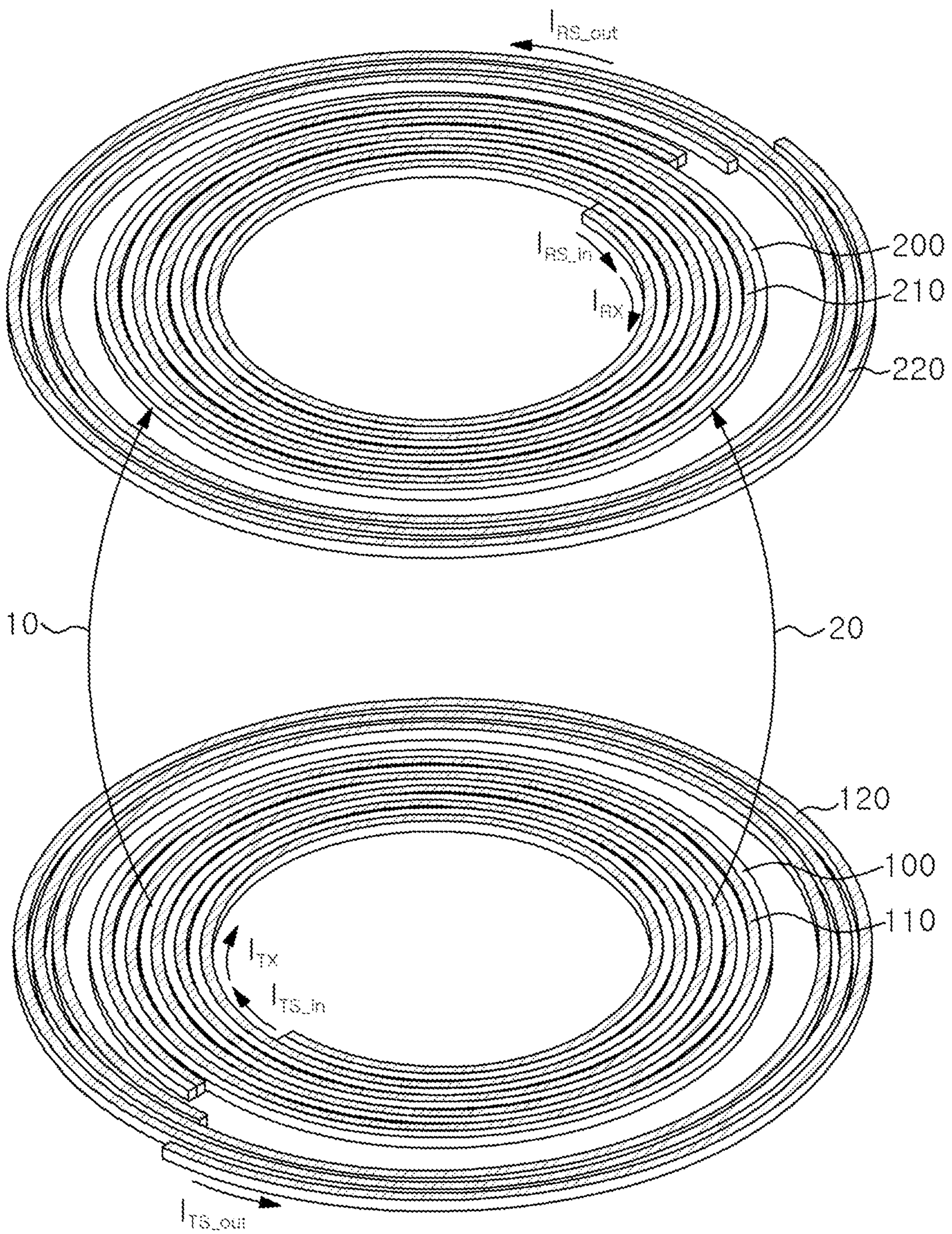
FIG. 11 is an exemplary diagram of a wireless power transmission apparatus and a wireless power reception apparatus constituting a wireless power transmission system according to another embodiment of the present disclosure.

FIG. 11 is an exemplary diagram of a wireless power transmission apparatus and a wireless power reception apparatus constituting a wireless power transmission system according to another embodiment of the present disclosure. If compared with FIG. 4, it can be seen that the power supply shielding coil 120 and the current collecting shielding coil 220 are further included in FIG. 11.

The feeding shielding coil 120 is wound a plurality of times with the same center in a state spaced apart from the outer portion of the structure formed by the feeding coil 100 and the feeding auxiliary coil 110, and a magnetic field of the out-of-phase with respect to a magnetic field generated by the feeding auxiliary coil 110 is generated to shield the leakage magnetic field.

The current collecting shielding coil 220 is wound a plurality of times with the same center spaced apart from the outer portion of the structure formed by the collecting coil 200 and the current collecting auxiliary coil 210, and the magnetic field of the out-of-phase with respect to a magnetic field generated by the current collecting auxiliary coil 210 is generated to shield the leakage magnetic field.

In the embodiment of FIGS. 3 and 4, an example of including both the feeding auxiliary coil 110 and the current collecting auxiliary coil 210 is shown, but it can be implemented to include only one of the feeding auxiliary coil 110 and the current collecting auxiliary coil 210. In addition, in the embodiment of FIG. 11, an example of including both the feeding shielding coil 120 and the current collecting shielding coil 220 is shown, but it can also be implemented to include only one of the feeding shielding coil 120 and the current collecting shielding coil 220.

The wireless power transmission apparatus and the wireless power reception apparatus of FIGS. 3, 4 and 11 may constitute a wireless power transmission system. In such a wireless power transmission system, the wireless power transmission apparatus may be referred to as a feeding apparatus, and the wireless power reception apparatus may be referred to as a current collecting apparatus.

The wireless power transmission system includes the feeding apparatus for wirelessly transmitting electrical energy through magnetic inductive coupling, and the current collecting apparatus for wirelessly receiving electrical energy through magnetic inductive coupling.

The power feeding apparatus includes a feeding coil that is wound a plurality of times with respect to the center, with a time-varying magnetic field being generated according to the operating frequency of the supply power, and wirelessly transmits electrical energy to the collecting coil of the current collecting apparatus exposed to the time-varying magnetic field through magnetic inductive coupling, and a feeding auxiliary coil that is wound with the feeding coil a plurality of times with the same center as the feeding coil, and generates a magnetic field of a phase that affects the feeding coil to provide additional inductance.

The current collecting apparatus includes a collecting coil that is wound a plurality of times with respect to the center and receives electrical energy wirelessly through magnetic inductive coupling when exposed to a time-varying magnetic field generated by the feeding coil according to an operating frequency of supply power, and a current collecting auxiliary coil that is wound with collecting coil a plurality of times with the same center as the collecting coil, and provides additional inductance by generating a magnetic field of a phase that affects the collecting coil.

Hereinafter, a description of the basic structure of the wireless power transmission system and a description of factors used to evaluate the performance of the wireless power transmission system 10 will be first described, and then an embodiment of the present disclosure will be explained again.

In the description of the embodiment, the feeding auxiliary coil 110 and the current collecting auxiliary coil 210 may be referred to as 'auxiliary coils', and in contrast to this, the feeding coil 100 and the collecting coil 200 may be referred to as ' primary coils'. In addition, the ' primary coil' and the 'auxiliary coil' may be referred to together as an 'integrated coil'.

The terms and meanings for each subscript included in the equivalent circuit diagram of the wireless power transmission system 10 of FIG. 7 are defined as follows.

- $V_{iN}$: Power source, an energy generating source for supplying electrical energy to the feeding coil 100 for wireless power transmission.
- $L_{TX}$: Feeding coil 100, a coil for transmitting electrical energy by magnetic inductive coupling by forming a magnetic field through electrical energy by the power source.
- $L_{RX}$: Collecting coil 200, a coil for receiving electrical energy by forming a magnetic inductive coupling circuit by the magnetic field generated at the feeding coil 100.
- $L_{TS}$: Feeding auxiliary coil 110, an auxiliary coil that is designed and applied to generate a magnetic field of a phase that affects the feeding coil 100 in order to impart additional inductance to the feeding coil 100.
- $L_{RS}$: Current collecting auxiliary coil 210, an auxiliary coil that is designed and applied to generate a magnetic field of a phase that affects the feeding coil 100 in order to impart additional inductance to the collecting coil 200.

$C_{TX}$: Feeding coil resonance capacitor, a capacitor for compensating a capacitive reactance corresponding to an inductive reactance of the feeding coil 100 to generate a resonance phenomenon in which reactive resistance is minimized with respect to the wireless power transmission operating frequency of the feeding coil 100.

$C_{RX}$: Collecting coil resonance capacitor, a capacitor for compensating for a capacitive reactance corresponding to an inductive reactance of the collecting coil 200 to generate a resonance phenomenon in which the reactive resistance is minimized with respect to the wireless power transmission operating frequency of the collecting coil 200.

$C_{TS}$: Feeding auxiliary coil resonance capacitor, a resonance capacitor for generating a magnetic field of the in-phase with a magnetic field generated by the feeding coil 100 in the auxiliary coil applied to the feeding coil 100, and for controlling the additional inductance by adjusting the strength of the current generated in the auxiliary coil.

$C_{RS}$: Collecting auxiliary coil resonance capacitor, a resonance capacitor for generating a magnetic field in the in-phase with a magnetic field generated by the collecting coil 200 in the auxiliary coil applied to the collecting coil 200, and for controlling the additional inductance by adjusting the strength of the current generated in the auxiliary coil.

$R_{TX}$: Internal resistance of the feeding part, a resistance component that causes power loss and deterioration of the quality factor of the feeding coil 100 as an internal resistance present in the feeding coil 100 and the feeding power source.

$R_{RX}$: Internal resistance of the current collecting part, a resistance component that causes power loss and deterioration of the quality factor of the collecting coil 200 as an internal resistance present in the collecting coil 100 and the current collecting rectifying circuit.

$R_{TS}$: Internal resistance of the feeding auxiliary coil, an internal resistance component present in the feeding auxiliary coil 110.

$R_{RS}$: Internal resistance of the current collecting auxiliary coil, an internal resistance component present in the current collecting auxiliary coil 210.

$R_L$: Load resistance, a load resistance that ultimately consumes the electrical energy received from the feeding coil.

$M_{TXRX}$: Mutual inductance of the feeding coil 100—the collecting coil 200.

$M_{TXTS}$: Mutual Inductance of the feeding coil 100—the feeding auxiliary coil 110.

$M_{TXRS}$: Mutual inductance of the feeding coil 100—the current collecting auxiliary coil 210.

$M_{RXRS}$: Mutual inductance of the collecting coil 200—the current collecting auxiliary coil 210.

$M_{RXTS}$: Mutual inductance of the collecting coil 200—the feeding auxiliary coil 110.

$M_{TSRS}$: Mutual inductance of the feeding auxiliary coil 110—the current collecting auxiliary coil 210.

$I_{TX}$: Current flowing through the feeding coil 100.

$I_{RX}$: Current flowing through the collecting coil 200.

$I_{TS}$: Current flowing in the feeding auxiliary coil 110.

$I_{RS}$: Current flowing through the current collecting auxiliary coil 210.

The wireless power transmission system 10 may basically include a feeding coil 100 and a collecting coil 200. When power is supplied to the feeding coil 100, a current is generated in the feeding coil 100, and as the current is generated in the feeding coil 100, a feeding magnetic field is formed. The feeding magnetic field generated from the feeding coil 100 is excited in the collecting coil 200, and accordingly, the feeding coil 100 and the collecting coil 200 are inductively coupled circuits through the magnetic field, and the electric energy can be wirelessly transmitted without direct contact by a conductor. At this time, one of the factors for evaluating the efficiency of the wireless power system is a quality factor (Q-factor).

FIG. 1 is an exemplary diagram illustrating the maximum size of a bandwidth and an electrical response according to various quality factors of the wireless power transmission system 10.

Referring to FIG. 1, the quality factor Q is determined as the peak value of the central frequency (operating frequency) electrical response with respect to the bandwidth (band).

Since the wireless power transmission system 10 having a low quality factor has a wide bandwidth from the operating frequency, robust operation is possible with respect to changes in operating performance according to changes in various operating conditions that occur during the wireless power transmission process. However, there is a disadvantage that the maximum value of wireless power transmission efficiency is low compared to a system having a high quality factor.

In the wireless power transmission system 10 having a high quality factor, the maximum value of wireless power transmission efficiency is increased, and it is possible to secure high power transmission efficiency compared to wireless power transmission having a low quality factor under ideal operating conditions. However, the bandwidth of the wireless power transmission system designed to have an excessively high quality factor due to a small bandwidth from the center frequency may be unstable compared to the wireless power transmission system 10 having a low quality factor in robustness of operation.

Therefore, since the amount of power transmission is determined depending upon how much magnetic field coupling between the two coils for transmitting and receiving power according to the quality factor of the wireless power transmission system 10, it is important to increase the efficiency by controlling the quality factors depending upon the situation in which the wireless power transmission system 10 is applied.

Conventionally, a method of improving the quality factor of the wireless power transmission system 10 by increasing the number of turns of the coil has been used. However, it is difficult to effectively increase the quality factor without increasing the internal resistance in the method of increasing the number of turns of the coil as shown in FIG. 2 to be described later.

Figure 2:
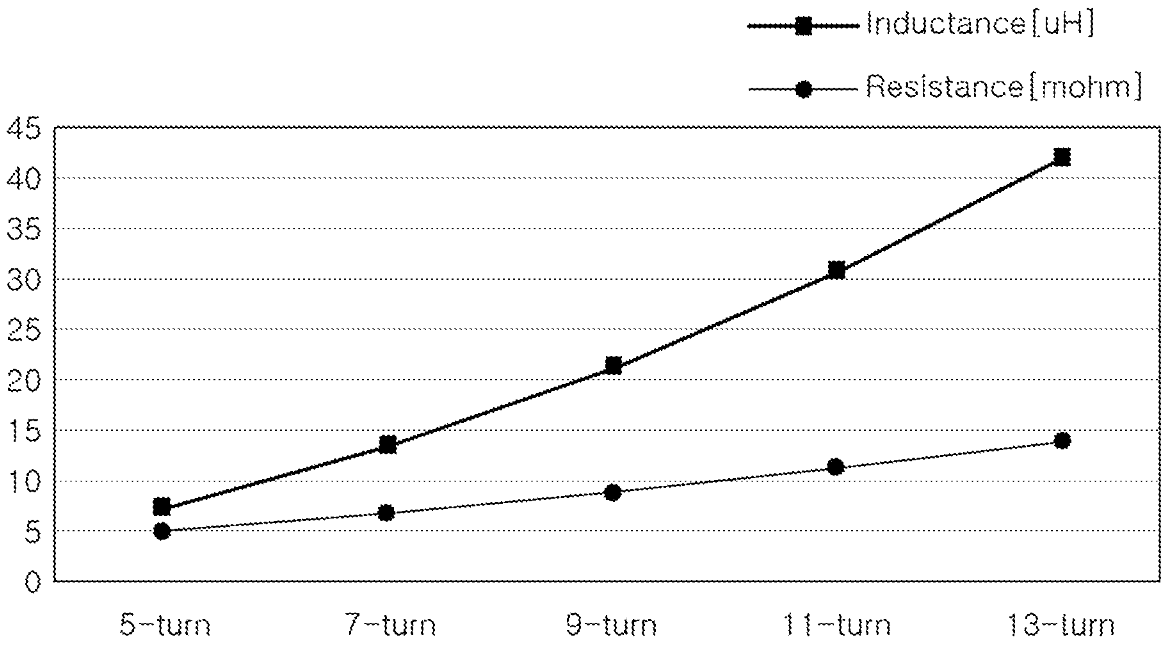
FIG. 2 is an exemplary diagram illustrating changes in inductance and internal resistance according to the number of turns of a coil.

FIG. 2 is an exemplary diagram illustrating changes in inductance and internal resistance according to the number of turns of a coil.

Referring to FIG. 2, although the inductance increases as the number of turns of the coil increases, the resistance of the coil also increases in proportion to the increase in the unit length as the number of turns of the coil increases.

That is, as the number of turns of the coil increases, a difference occurs not only in an increase in inductance relative to a unit length of the entire used coil, but also in an increase in the internal resistance of the coil. This is because, considering the variables that determine the coil quality factor Q=(w*L)/R (w: angular frequency, L: inductance, R: resistance), as the number of turns of the coil increases, not only the inductance of the coil but also the internal resistance of the coil is simultaneously increased, so it is difficult to effectively increase the quality factor without increasing the internal resistance only by increasing the number of turns of the coil.

According to the embodiment of the present disclosure, by configuring an auxiliary coil generating a magnetic field having the in-phase or out-of-phase with respect to a magnetic field generated by the feeding coil 100 or the collecting coil 200 basically used in the wireless power transmission system 10, so that the mutual inductance by the auxiliary coil is applied as an additional inductance with respect to the feeding coil 100 or the collecting coil 200, it is possible to control the inductance and quality factor of the entire system to increase or decrease without changing the number of turns of the feeding coil 100 or the collecting coil 200.

The feeding coil 100 is a coil that forms a magnetic field as a current is generated when power is supplied from the wireless power transmission system 10.

The collecting coil 200 is a coil through which an induced current flows by the magnetic field generated from the feeding coil 100.

The feeding auxiliary coil 110 is a coil that may be physically insulated from and adjacent to the feeding coil 100, but in which a current may be induced by a magnetic field.

The current collecting auxiliary coil 210 is a coil that may be physically insulated from and adjacent to the collecting coil 200, but in which a current may be induced by a magnetic field.

If the primary coil and the auxiliary coil are configured according to the embodiment of the present disclosure, when a current flows in the primary coil, the mutual inductance may increase or decrease as shown in FIGS. 5 and 6 according to the phase of a magnetic field generated in each coil.

Figure 6A:
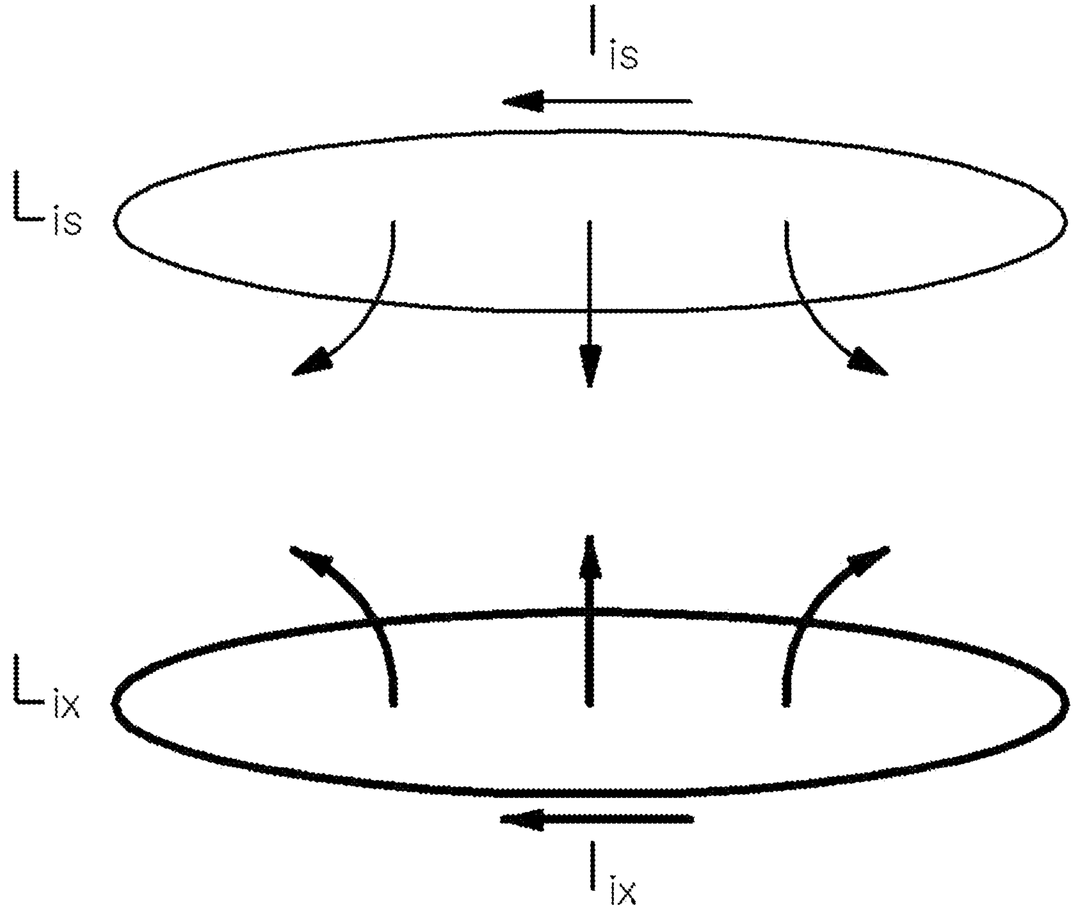
FIGS. 6A and 6B are exemplary diagrams exemplary diagram for explaining a change in inductance and coupling of a magnetic field generated when the magnetic fields of the primary coil and the auxiliary coil constituting the wireless power transmission apparatus and the wireless power reception apparatus, respectively, are out of phase.
Figure 6B:
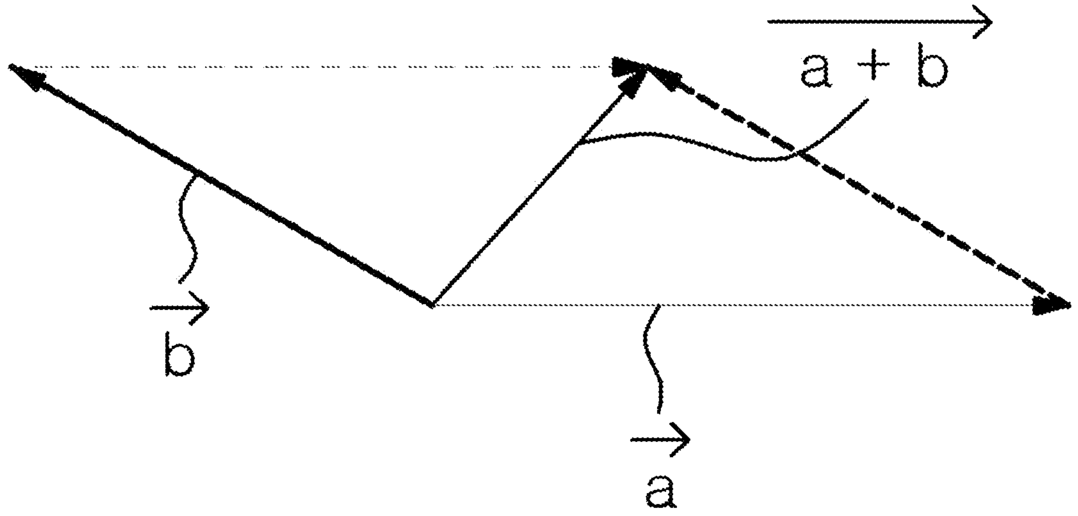

FIGS. 6A and 6B are exemplary diagrams for explaining the combination of the generated magnetic field and the change in effective inductance when the magnetic fields of the primary coil and the auxiliary coil are out-of-phase.

Referring to FIG. 6A, if the current of the auxiliary coil Ls has an out-of-phase with respect to the current $I_{iX}$ generated in the primary coil, a magnetic field is generated in the auxiliary coil in a direction opposite to the magnetic field generated in the primary coil.

Referring to FIG. 6B, if a magnetic field vector (a) generated in the primary coil has an out-of-phase with respect to a magnetic field vector (b) generated in the auxiliary coil, a magnitude component in the sum of the two magnetic field vectors decreases and effective inductance is reduced.

For example, when the self-inductance of the primary coil is $L_{iX\_self}$ and the self-inductance of the auxiliary coil is $L_{is\_self}$, the mutual inductance $M_{iXiS}$ between the primary coil and the auxiliary coil may be defined as $k_{iXiS}\sqrt{L_{iX}L_{iS}}$ ($k_{iXiS}$ is a coupling coefficient). The effective inductance $L_{iX\_mix}$ considering the self-inductance of the primary coil and the mutual inductance between the primary coil and the auxiliary coil generating a magnetic field of an out-of-phase with respect to a magnetic field generated by the primary coil can be defined as $L_{iS\_self}-M_{iXiS}$, and the quality factor $Q_{iX\_mix}$ according to the internal resistance $R_{iX}$ of the primary coil can be defined as $(w*L_{iX\_mix})/R_{iX}$. That is, if the magnetic field generated by the auxiliary coil has the out-of-phase with respect to the magnetic field generated by the primary coil, the effective inductance is reduced, and as a result, the quality factor may be reduced.

Figure 5A:
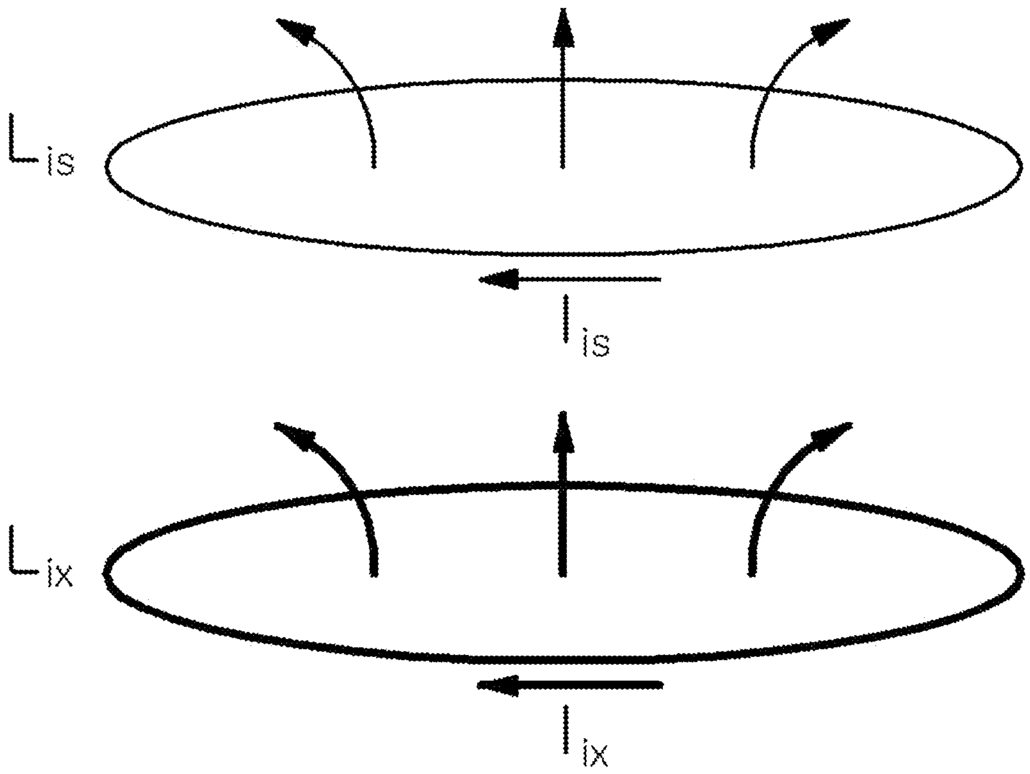
FIGS. 5A and 5B are exemplary diagrams for explaining a change in inductance and coupling of a magnetic field that occurs when magnetic fields of a primary coil and an auxiliary coil constituting the wireless power transmission apparatus and the wireless power reception apparatus, respectively, are in phase.
Figure 5B:
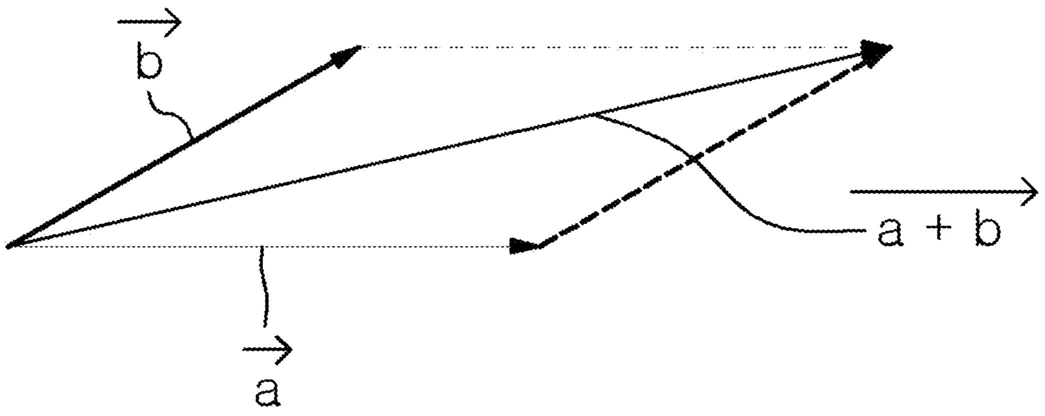

FIGS. 5A and 5B are exemplary diagrams for explaining a combination of a generated magnetic field and a change in effective inductance if a magnetic field generated by the primary coil and a magnetic field generated by auxiliary coil is in-phase.

Referring to FIG. 5A, if the current Ls of the auxiliary coil has the in-phase with respect to the current $I_{iX}$ of the primary coil, a magnetic field is generated in the auxiliary coil in the same direction as the magnetic field generated in the primary coil.

Referring to FIG. 5B, if a magnetic field vector (a) generated in the primary coil has an in-phase with respect to a magnetic field vector (b) generated in the auxiliary coil, a magnitude component in the sum of the two magnetic field vectors increases and effective inductance is increased.

For example, when the self-inductance of the primary coil is $L_{iX\_self}$ and the self-inductance of the auxiliary coil is $L_{iS\_self}$, the mutual inductance $M_{iXiS}$ between the primary coil and the auxiliary coil may be defined as $k_{iXiS}\sqrt{L_{iX}L_{iS}}$ ($k_{iXiS}$ is a coupling coefficient). The effective inductance $L_{iX\_mix}$ considering the self-inductance of the primary coil and the mutual inductance with the auxiliary coil generating the magnetic field in-phase with respect to a magnetic field generated by the primary coil may be defined as $L_{iS\_self}+M_{iXiS}$, and the quality factor $Q_{iX\_mix}$ according to the internal resistance $R_{iX}$ of the primary coil may be defined as $(w*L_{iX\_mix})/R_{iX}$. That is, when the magnetic field generated by the auxiliary coil is in-phase with respect to the magnetic field generated by the primary coil, the effective inductance is increased, and as a result, the quality factor can be increased.

According to FIGS. 5A, 5B, 6A and 6B, the wireless power transmission system 10 according to the embodiment of the present disclosure is configured such that the auxiliary coil is adjacent to the feeding coil 100 or the collecting coil 200. Thus, it is possible to control the quality factor of the wireless power transmission system 10 in a manner that changes the effective inductance generated by the interaction between the primary coil and the auxiliary coil. For example, the wireless power transmission system 10 may be designed and manufactured to have a necessary effective inductance. Alternatively, the wireless power transmission system 10 may include a sensor capable of measuring at least one of inductance, capacitance, internal resistance, power transmission efficiency, etc., and a microprocessor, etc., and the effective inductance of the corresponding wireless power transmission system 10 may be determined according to the control by the microprocessor that receives a measurement value by the sensor.

In the wireless power transmission system 10 according to the embodiment, an increase in inductance according to the auxiliary coil results in a change in effective inductance. The change in effective inductance depends on the strength of the influence of the magnetic field from the auxiliary coil, and the strength of the influence of the magnetic field is determined by the mutual inductance with the auxiliary coil and the strength of the current flowing through the primary coil and the auxiliary coil. In this regard, an expression according to Kirchhoff's voltage law (KVL) for the equivalent circuit diagram of FIG. 7 is expressed as Equation 1.

$$\frac{V_{TX}}{j\omega L_{TX}I_{TX}} = \left(\frac{R_{TX}}{j\omega L_{TX}I_{TX}} + 1 - \frac{\omega_0^2}{\omega_{TX}^2}\right) + k_{TXRX}^2 L_{RX}\left(\frac{I_{RX}}{I_{TX}}\right) + k_{TXTS}^2 L_{TS}\left(\frac{I_{TS}}{I_{TX}}\right) + k_{TXRS}^2 L_{RS}\left(\frac{I_{RS}}{I_{TX}}\right) \quad \text{[Equation 1]}$$

$$0 = \left(\frac{R_{TS}}{j\omega L_{TS}I_{TS}} + 1 - \frac{\omega_0^2}{\omega_{TS}^2}\right) + k_{TXTS}^2 L_{TX}\left(\frac{I_{TX}}{I_{TS}}\right) + k_{RXTS}^2 L_{RX}\left(\frac{I_{RX}}{I_{TS}}\right) + k_{TSRS}^2 L_{RS}\left(\frac{I_{RS}}{I_{TS}}\right)$$

$$0 = \left(\frac{R_{RS}}{j\omega L_{RS}I_{RS}} + 1 - \frac{\omega_0^2}{\omega_{RS}^2}\right) + k_{TXRS}^2 L_{TX}\left(\frac{I_{TX}}{I_{RS}}\right) + k_{RXRS}^2 L_{RX}\left(\frac{I_{RX}}{I_{TS}}\right) + k_{TSRS}^2 L_{TS}\left(\frac{I_{TS}}{I_{RS}}\right)$$

$$0 = \left(\frac{R_{RX}}{j\omega L_{RX}I_{RX}} + 1 - \frac{\omega_0^2}{\omega_{RX}^2}\right) + k_{TXRX}^2 L_{TX}\left(\frac{I_{TX}}{I_{RX}}\right) + k_{RXTS}^2 L_{TS}\left(\frac{I_{TS}}{I_{RX}}\right) + k_{RXRS}^2 L_{RS}\left(\frac{I_{RS}}{I_{RX}}\right)$$

It can be seen from Equation 1 that all coils constituting the wireless power transmission system 10 are influenced by each other by mutual inductance. In this case, when only the magnetic field effect between the adjacent primary coil and the auxiliary coil is considered, the effective inductance of the primary coil may be expressed as Equation 2, and the effective inductance of the auxiliary coil may be expressed as Equation 3.

$$L_{iX\text{-}effective} = L_{iX} + k_{iXiS}^2 L_{iS}\left(\frac{I_{iS}}{I_{iX}}\right) \quad \text{[Equation 2]}$$

$$L_{iS\text{-}effective} = L_{iS} + k_{iXiS}^2 L_{iX}\left(\frac{I_{iX}}{I_{iS}}\right) \quad \text{[Equation 3]}$$

The quality factor of the primary coil according to the effective inductance may be expressed as Equation 4, and the quality factor of the auxiliary coil according to the effective inductance may be expressed as Equation 5.

$$Q_{iX\text{-}loaded} = \frac{\omega\left(L_{iX} + k_{iXiS}^2 L_{iS}\left(\frac{I_{IS}}{I_{iX}}\right)\right)}{R_{iX}} \quad \text{[Equation 4]}$$

$$Q_{iS\text{-}loaded} = \frac{\omega\left(L_{iS} + k_{iXiS}^2 L_{iX}\left(\frac{I_{IS}}{I_{iX}}\right)\right)}{R_{iS}} \quad \text{[Equation 5]}$$

From the above equation, it can be seen that when the primary coil and the auxiliary coil have a high coupling coefficient, and when the magnitude of the auxiliary coil current is large compared to the primary coil current, the quality factor of the primary coil increases significantly. Thereby, the efficiency improvement occurs according to the increase of the quality factor.

On the other hand, the wireless power transmission system 10 according to the embodiment may determine a capacitor for generating a magnetic field considering a phase of the magnetic field.

Figure 8:
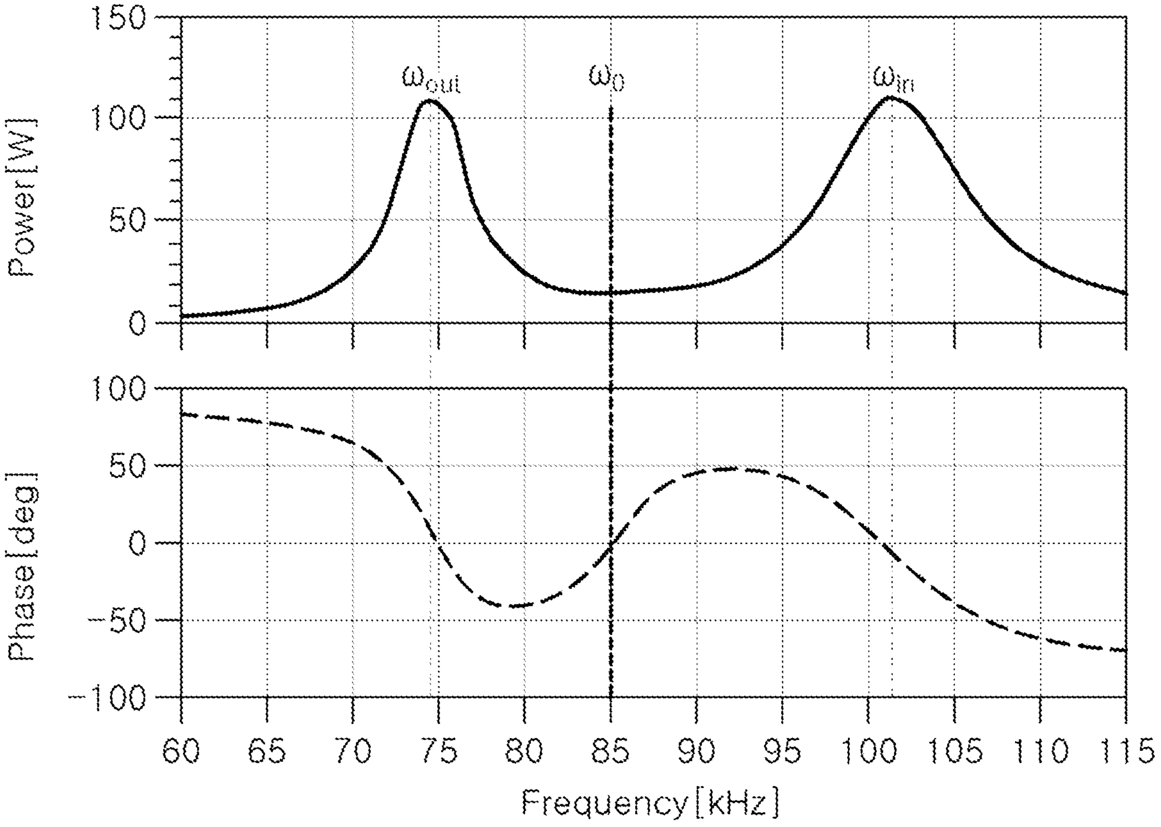
FIG. 8 is a graph illustrating power transmission characteristics for each frequency according to a coupling coefficient between the primary coil and the auxiliary coil.

The primary coil and the auxiliary coil are adjacent to each other to have a high coupling coefficient, and in this case, the power transmission characteristics for each frequency of the wireless power transmission system 10 may be represented as shown in FIG. 8.

Through the graph of FIG. 8, when the auxiliary coil is applied, it can be confirmed that the resonant frequency at which the wireless power transmission system 10 has a zero phase angle may include a resonant frequency for the out-of-phase operation $\omega_{out}$, a resonant frequency according to the self-inductance of the coil $\omega_o$, and a resonance frequency for in-phase operation $\omega_i$.

At this time, if the capacitance is determined by the resonance frequency $\omega_o$ according to the self-inductance of the coil, it can be seen that the amount of transmittable power is greatly reduced, and a resonance capacitor should be determined with respect to the frequency of $\omega_i$ for the in-phase operation.

In this regard, the resonance capacitance of the primary coil for satisfying the resonance condition and generating the in-phase magnetic field may be determined as shown in Equation 6, and the resonance capacitance of the auxiliary coil may be determined as shown in Equation 7.

$$C_{iX} = \frac{1}{\left(2\pi\left(\sqrt{1 + k_{iXiS}\sqrt{\frac{L_{iS}}{L_{iX}}}}\right)f_o\right)^2 \times L_{iX}} \quad \text{[Equation 6]}$$

$$C_{iS} = \frac{1}{\left(2\pi\left(\sqrt{1 + k_{iXiS}\sqrt{\frac{L_{iX}}{L_{iS}}}}\right)f_o\right)^2 \times L_{iS}} \quad \text{[Equation 7]}$$

Here, $C_{iX}$ the capacitance of the primary coil, $C_{iS}$ is the capacitance of the auxiliary coil, $k_{iXiS}$ has is the coupling coefficient between the primary and auxiliary coils, $f_o$ is the operating frequency of the system, $L_{iX}$ is the inductance of the primary coil, and $L_{iS}$ the inductance of the auxiliary coil.

When the resonance capacitance is determined for the primary coil and the auxiliary coil as in Equations 6 and 7, a current flowing the primary coil has an in-phase with respect to a current flowing the auxiliary coil.

Figure 9:
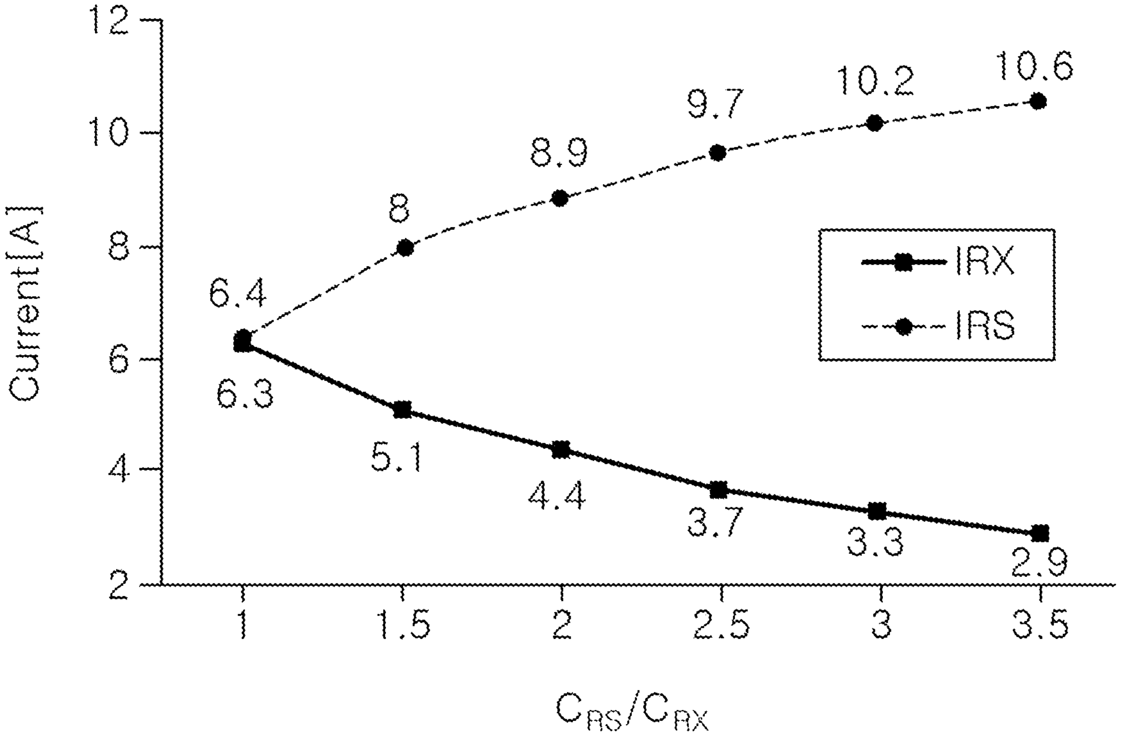
FIG. 9 is a graph illustrating a change in current according to a capacitance ratio between the primary coil and the auxiliary coil.

As shown in Equation 4 above, it was confirmed that the quality factor improvement effect of the primary coil was increased when the current of the auxiliary coil compared to the primary coil was increased. The adjustment of the current can be achieved by adjusting the capacitance in addition to Equations 6 and 7. By additionally adjusting the capacitance of the primary coil as shown in Equation 8 or additionally adjusting the capacitance of the auxiliary coil as shown in Equation 8, the resonance state may be maintained and a current difference may be generated between the coils as shown in FIG. 9.

$$C_{iX} = \frac{1}{\left(2\pi\left(\sqrt{1 + k_{iXiS}\sqrt{\frac{L_{iS}}{L_{iX}}}}\right)f_o\right)^2 \times L_{iX}} - C_{tune} \quad \text{[Equation 8]}$$

$$C_{iS} = \frac{1}{\left(2\pi\left(\sqrt{1 + k_{iXiS}\sqrt{\frac{L_{iX}}{L_{iS}}}}\right)f_o\right)^2 \times L_{iS}} + C_{tune} \quad \text{[Equation 9]}$$

That is, when the capacitance of the primary coil is reduced by the adjustment variable, the resonance condition of the auxiliary coil is also proportionally changed, and the resonance capacitance corresponding thereto can be generalized as being added by the adjustment amount of the capacitance of the primary coil.

The principle of such capacitance control is that as the capacitance of the primary coil decreases, the current generated in the primary coil decreases, and accordingly, the effect of the primary coil on the auxiliary coil decreases. That is, the principle of the capacitance control is that the effective inductance of the auxiliary coil decreases as the magnetic field decreases due to the decrease in the current of the primary coil, and at this time, the resonance capacitance corresponding to the reduced effective inductance increases to the same as the capacitance adjustment amount of the primary coil.

Figure 10:
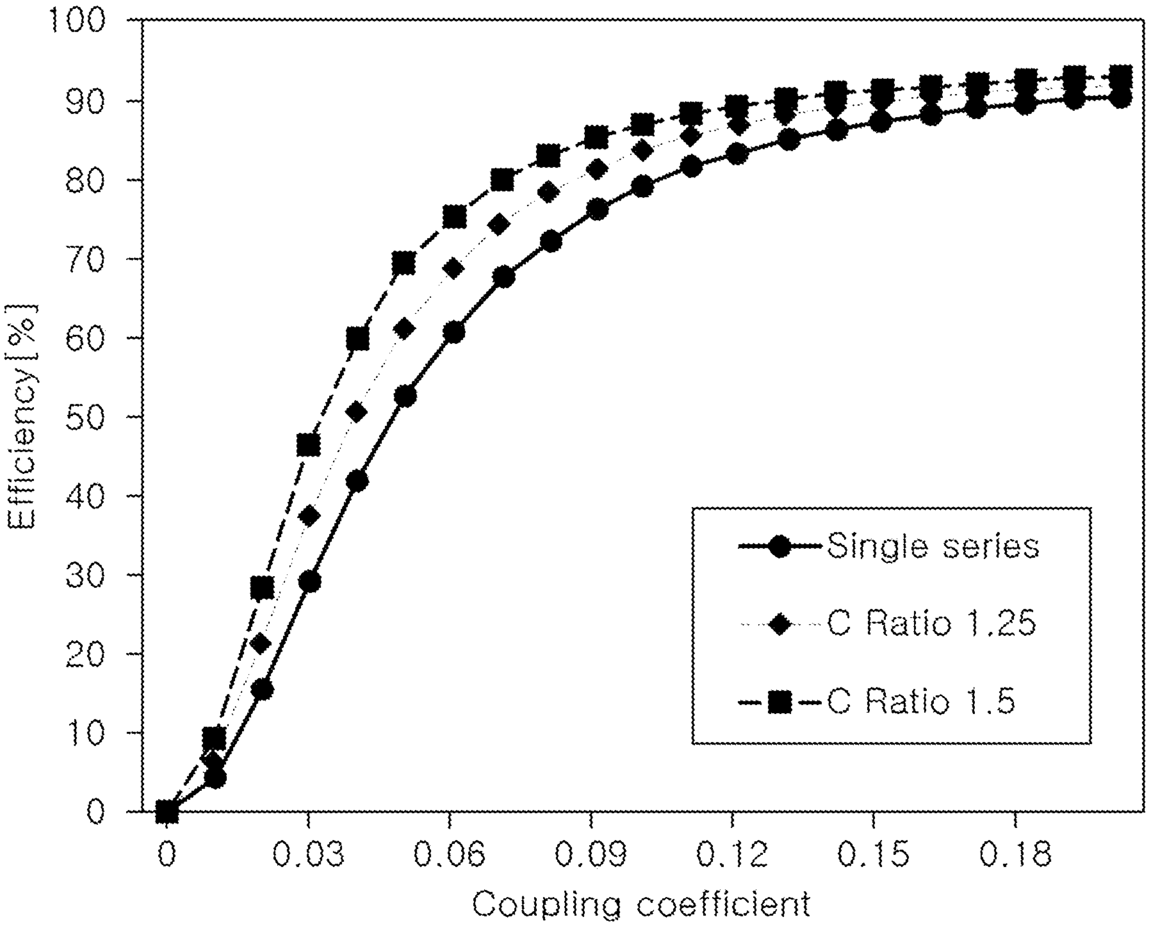
FIG. 10 is a graph illustrating a change in efficiency according to the capacitance ratio between the primary coil and the auxiliary coil.

FIG. 10 is a graph showing the effect on efficiency according to a change in the capacitance ratio, and 'C Ratio' means the ratio of the primary coil and the auxiliary coil. From this graph, it can be seen that the efficiency improvement effect occurs as the capacitance ratio of the primary coil and the auxiliary coil increases. Efficiency is calculated as the ratio of the power reaching the load to the electrical loss occurring in the entire system as shown in Equation 10. In Equation 10, auxiliary coils applied to each of the feeding coil 100 (TX) and the collecting coil 200 (RX) are expressed as TS and RS.

$$\eta_{system} = \frac{R_L|I_{RX}|^2}{R_{TX}|I_{TX}|^2 + (R_{RX} + R_L)|I_{RX}|^2 + R_{TS}|I_{TS}|^2 + R_{RS}|I_{RS}|^2} \quad \text{[Equation 10]}$$

In consideration of the effect of efficiency due to the change in the capacitance ratio, the wireless power transmission apparatus of the wireless power transmission system 10 adjusts at least one of the capacitance of the feeding coil 100 and the capacitance of the feeding auxiliary coil 110 to determine the effective inductance generated by the interaction of the feeding coil 100 and the feeding auxiliary coil 110. In addition, the wireless power transmission apparatus of the wireless power transmission system 10 adjusts at least one of the capacitance of the collecting coil 200 and the capacitance of the current collecting auxiliary coil 210 to determine effective inductance caused by the interaction of the collecting coil 200 and the current collecting auxiliary coil 210.

As in the embodiment shown in FIG. 11, when the power supply shielding coil 120 and the current collecting shielding coil 220 are added, a magnetic field having an out-of-phase with respect to magnetic fields of the primary coil and the auxiliary coil is generated in the power supply shielding coil 120 to shield the leakage magnetic field. Further, a magnetic field having an out-of-phase with respect to magnetic fields of the primary coil and the auxiliary coil is generated in the current collecting shielding coil 220 to shield the leakage magnetic field.

Figure 12:
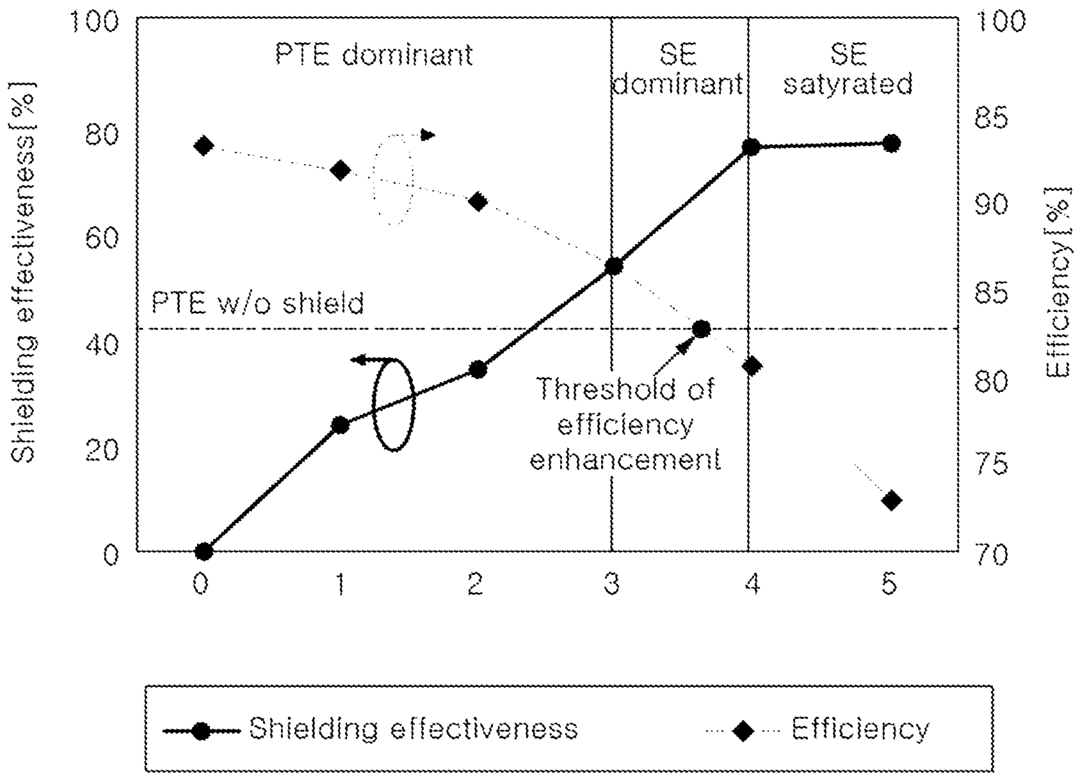
FIG. 12 is a graph showing changes in shielding performance and efficiency according to a change in the number of turns of the feeding shielding coil and the current collecting shielding coil shown in FIG. 11.

By controlling the number of turns of the power supply shielding coil 120 and the current collecting shielding coil 220 in addition to the method of adjusting the capacitance for improving the efficiency described above, as shown in FIG. 12, the power transmission efficiency (PTE) can be improved, and the leakage magnetic field can be reduced through the shielding effectiveness (SE).

Operational characteristics according to the number of turns of the feeding shielding coil 120 and the current collecting shielding coil 220 may be largely divided into efficiency dominant (PTE dominant), shielding dominant (SE dominant), shielding saturated (SE saturated), and the like. The efficiency-dominant operating characteristic refers to an area where efficiency is improved and shielding performance occurs, and it can be seen that the shielding performance at this time is lower than the shielding-dominant operating characteristic. The shielding dominant operating characteristic shows an operating characteristic in which high shielding performance occurs but the efficiency is slightly decreased. Although the shielding saturation operation characteristic does not show a significant increase in shielding performance compared to the shield-dominant operation, it can be seen that the efficiency is significantly reduced. Accordingly, the number of turns of the feeding shielding coil 120 and the current collecting shielding coil 220 can use shield-dominant operation characteristics as the basis for design.

FIG. 13 is an exemplary diagram of simulation conditions applied to a primary coil having the number of turns of 30 turns, and simulation conditions applied to a primary coil having the number of turns of 15 turns and an auxiliary coil having the number of turns of 15 turns.

Referring to FIG. 13, the separation distance between the feeding coil 100 and the collecting coil 200 used in the simulation was set to 400 mm, the coupling coefficient of the two coils was 0.0136, and the input voltage was fixed to 35V in both simulations. In addition, the internal resistance of the power apparatus connected to the feeding coil 100 and the collecting coil 200 was set to 500 mΩ, respectively, and the load resistance was set to 10Ω. The inductance of each coil, the internal resistance, and the capacitance applied thereto are as shown in FIG. 13.

According to an embodiment, it can be seen that the self-inductance of a coil having 15 turns is reduced to about ¼ compared to a coil having 30 turns, and as the length of the coil is reduced by half, the internal resistance of the coil is decreased by ½. Further, the 15-turn coil with only the self-inductance of the feeding coil 100 and the collecting coil 200 has lower efficiency than the 30-turn coil, but it can be seen that the 15-turn coil can generate higher efficiency than the 30-turn coil by the auxiliary inductance generated by the auxiliary coil.

Figure 14:
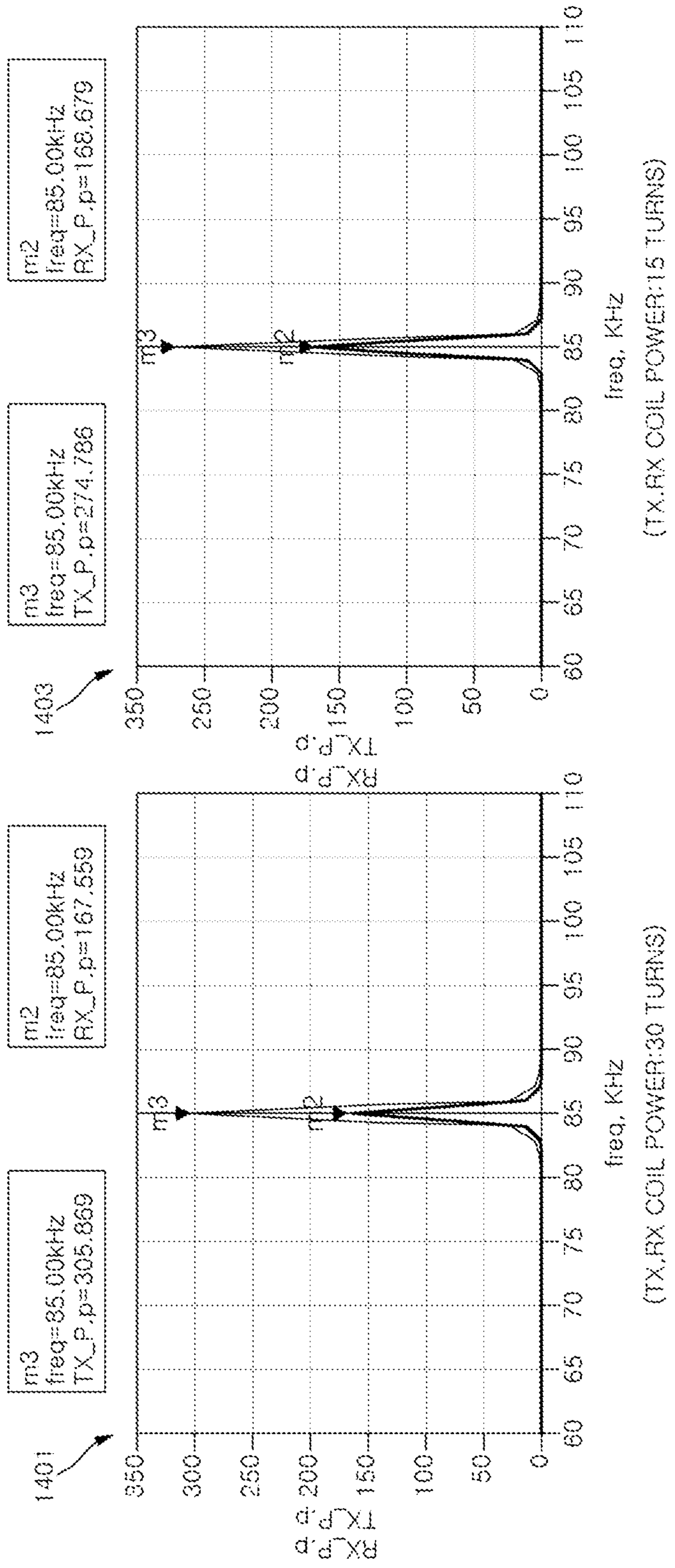
FIGS. 14 to 16 are comparison graphs that show power, current, and power transmission efficiency with respect to the simulation applying the primary coil with 30 turns and the simulation applying the primary coil with 15 turns and the auxiliary coil with 15 turns.
Figure 15:
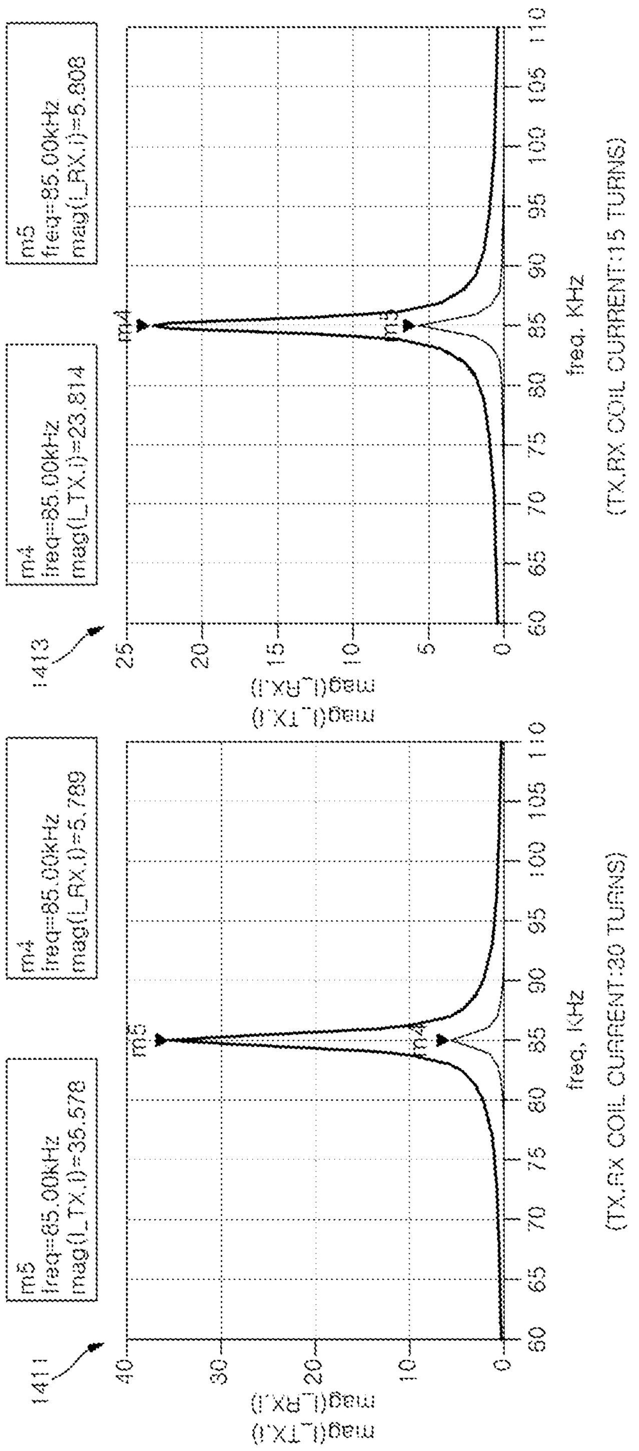
Figure 16:
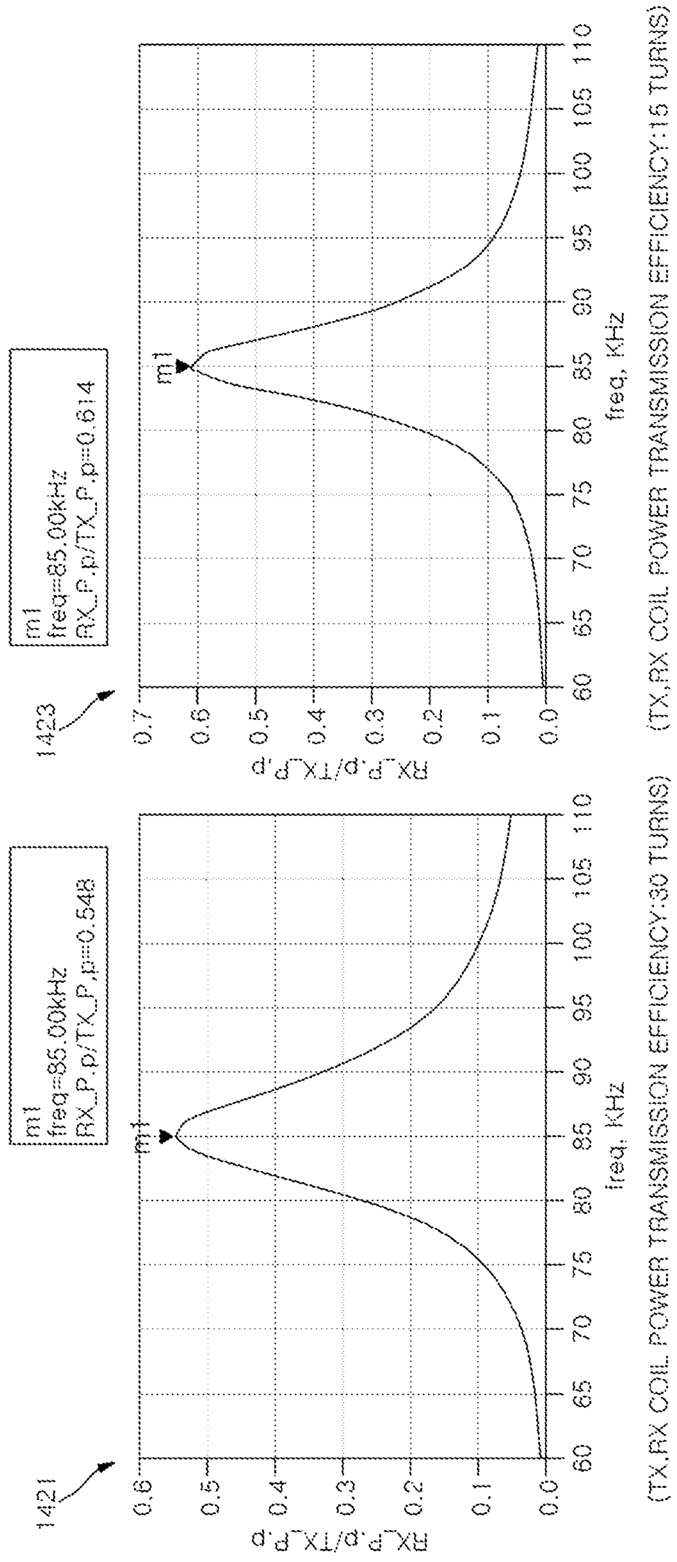

FIGS. 14 to 16 are comparison graphs of power, current, and power transmission efficiency with respect to the simulation applying the primary coil with 30 turns and the simulation applying the primary coil with 15 turns and the auxiliary coil with 15 turns.

Referring to FIG. 14, when the capacitance of the auxiliary coil is adjusted so that the received power of the coil with 15 turns is equal to the received power of the coil with 30 turns, even though the TX power of the coil with 15 turns disclosed in a right graph 1403 is lower than the TX power of the coil with 30 turns disclosed in a left graph 1401, it can be confirmed that RX power of a similar level to each other is generated, and through this, it can be confirmed that efficiency can be improved according to an increase in the quality factor.

Referring to FIG. 15, it can be seen that the TX current of the coil with 30 turns disclosed in a left graph 1411 is higher than the TX current of the coil with 15 turns disclosed in a right graph 1413. Through this, it can be confirmed that the current is lowered even at the same voltage depending on the effect of the additional impedance corresponding to the auxiliary coil. This reduction in TX current results in that the loss due to the internal resistance existing in the apparatus connected to the TX is lower in the coil with the number of turns of 15 turns compared to the coil with the number of turns of 30 turns.

Referring to FIG. 16, it can be seen that the power transmission efficiency disclosed in a right graph 1423 when the auxiliary coil is used is 6.6% higher than the efficiency disclosed in a left graph 1421 when using the coil having 30 turns.

As such, according to the embodiment of the present disclosure, it is possible to improve the quality factor and improve the efficiency of the wireless power transmission system 10 based on the auxiliary inductance using the auxiliary coil without increasing the number of turns for the primary coil.

Figure 17:
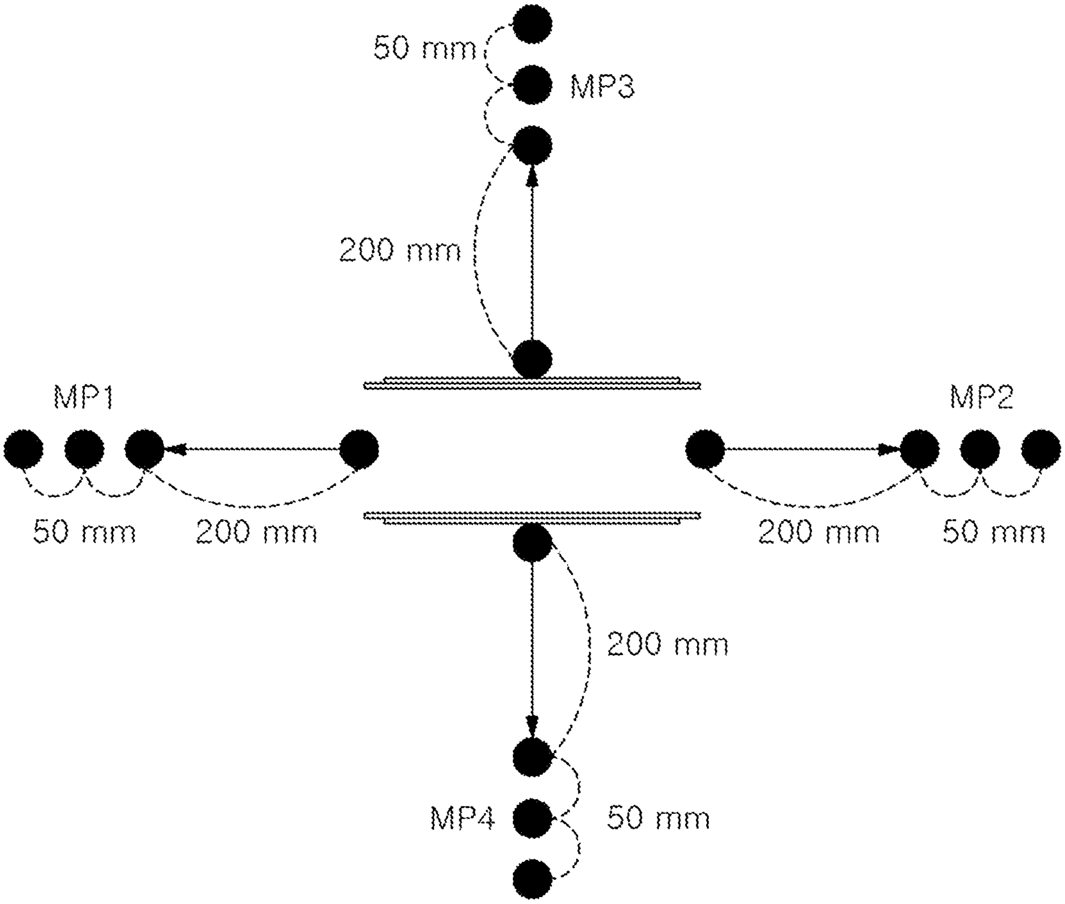
FIG. 17 is a diagram showing the measurement position of the leakage magnetic field in the case of applying the feeding shielding coil and the current collecting shielding coil as in the embodiment shown in FIG. 11.
Figure 18:
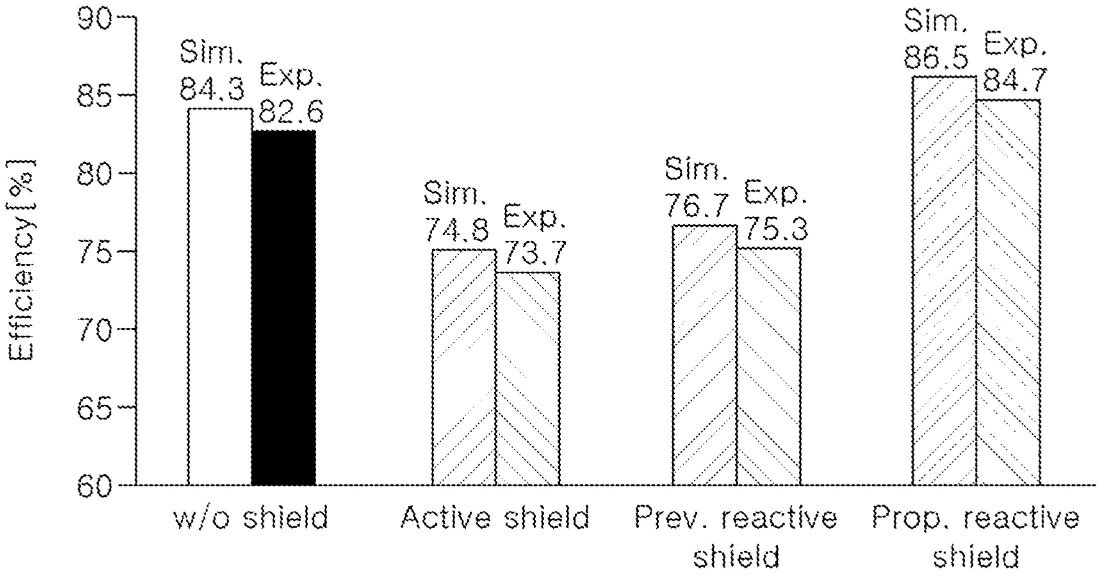
FIG. 18 is a graph comparing the efficiency of each shielding method.
Figure 19:
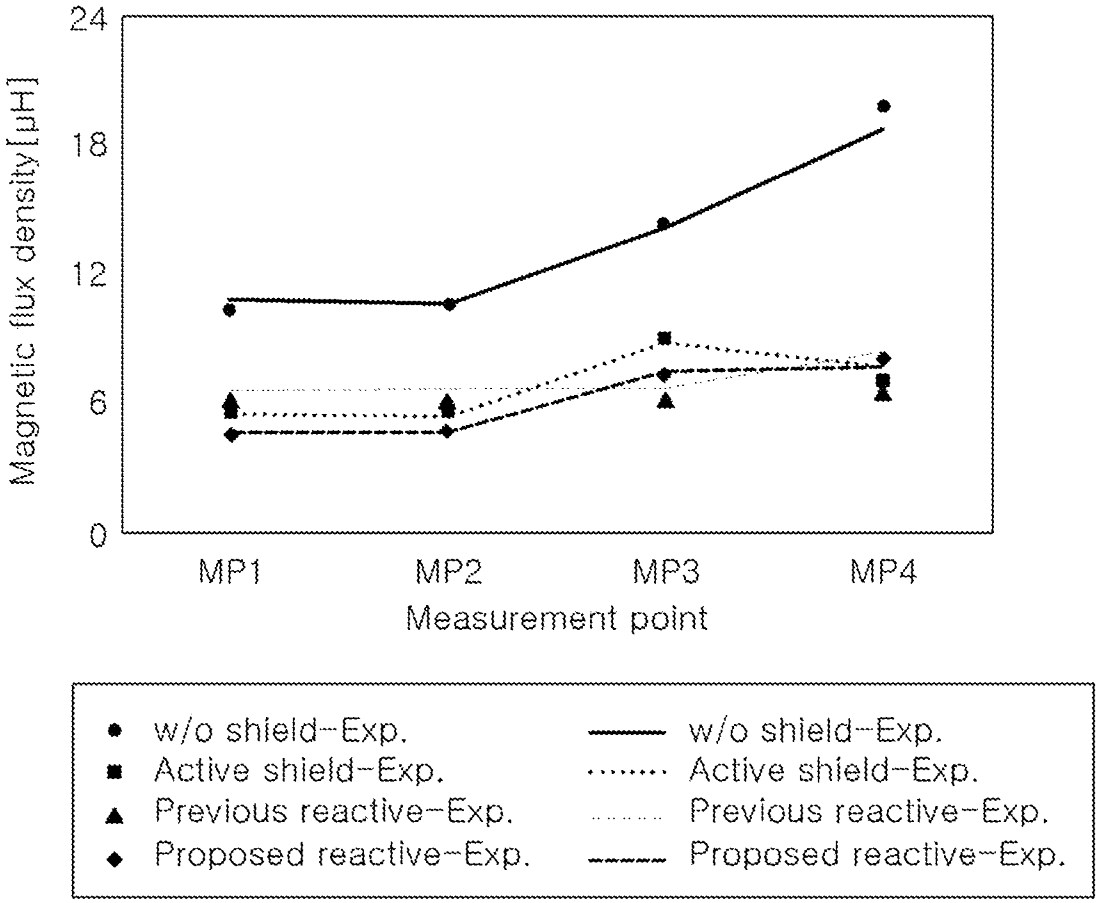
FIG. 19 is a graph comparing shielding performance for each shielding method.

FIG. 17 shows the measurement positions of the leakage magnetic field when the feeding shielding coil and the current collecting shielding coil are applied as in the embodiment shown in FIG. 11, FIG. 18 is a graph comparing efficiencies for each shielding method, and FIG. 19 is a graph comparing the shielding performance of each shielding method.

Here, the number of turns of the coil for each shielding method is as follows, and the reliability of comparative data was improved by using the same amount of coils for each shielding method. Table 1 shows the inductance and the capacitor for each shielding method.

w/o shield: 10 turns of the feeding coil, 10 turns of the collecting coil.

Active shield: 10 turns of the feeding coil, 10 turns of the collecting coil, 3 turns of the outer feeding coil, 3 turns of the outer collecting coil.

Previous reactive shield: 10 turns of the feeding coil, 10 turns of the collecting coil, 3 turns of the feeding shielding coil, 3 turns of the current collecting shielding coil.

Proposed shield: 5 turns of the feeding coil, 5 turns of the feeding auxiliary coil, 5 turns of the collecting coil, 5 turns of the current collecting auxiliary coil, 3 turns of the feeding shielding coil, 3 turns of the current collecting shielding coil.

TABLE 1

| | w/o shield | Active shield | Previous reactive shield | Proposed shield |
|---|---|---|---|---|
| $L_{TX}$ [μT] | 60.4 | 57.6 | 60.4 | 15.9 |
| $L_{RX}$ [μT] | 59.2 | 56.8 | 59.2 | 15.8 |
| $L_{TS}$ [μT] | | | 7.8 | 19.1 |
| $L_{RS}$ [μT] | | | 7.8 | 20.4 |
| $C_{TX}$ [nF] | 55 | 59.4 | 61.7 | 86.3 |
| $C_{RX}$ [nF] | 58.4 | 61.5 | 61.6 | 68.5 |
| $C_{TS}$ [nF] | | | 2.4 [μF] | 148.2 |
| $C_{RS}$ [nF] | | | 2.4 [μF] | 148.2 |

For three measurement points at each measurement position MP1, an average as in Equation 11 was calculated as the leakage magnetic field at each position. In addition, the average leakage magnetic field was calculated by calculating an average value as in Equation 12 for a total of four measurement positions MP1, MP2, MP3 and MP4. The shielding performance was compared by calculating the ratio between the case where the auxiliary coil was not applied and the case where the auxiliary coil was applied as shown in Equation 13 for the calculated average leakage magnetic field.

$$B_{MPi} = \frac{B_{MPi_1} + B_{MPi_2} + B_{MPi_3}}{3} \quad \text{[Equation 11]}$$

$$B_{average} = \frac{B_{MP_1} + B_{MP_2} + B_{MP_3} + B_{MP_4}}{4} \quad \text{[Equation 12]}$$

$$SE = \left(1 - \frac{B_{average-w/\ shield}}{B_{average-w/o\ shield}}\right) \times 100 \quad \text{[Equation 13]}$$

Referring to FIG. 18, it can be seen that the efficiency of the other shielding method is decreased compared to the case where the shielding coil is not applied (w/o shield), but the efficiency of the shielding method according to the embodiment of the present disclosure is increased.

Through FIG. 19, it can be confirmed that the shielding method according to the embodiment of the present disclosure generates the same level of shielding performance with other shielding methods.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A wireless power transmission apparatus comprising:

a feeding coil configured to be wound a plurality of times with respect to a center, generate a time-varying magnetic field according to operating frequency of a supply power, and wirelessly transmit an electrical energy to a collecting coil exposed to the time-varying magnetic field through magnetic inductive coupling; and a feeding auxiliary coil configured to be wound along with the feeding coil a plurality of times with respect to the same center as the feeding coil, generate an auxiliary magnetic field with a phase that affects the feeding coil, and provide additional inductance generated by the auxiliary magnetic field, wherein the additional inductance increases as a ratio of a current flowing to the feeding auxiliary coil to a current flowing in the feeding coil becomes greater, and wherein the feeding coil and the feeding auxiliary coil are not directly electrically connected to each other, and a current flows in the feeding auxiliary coil by magnetic induction from the feeding coil.

2. The apparatus of claim 1, wherein a magnetic field generated by the feeding coil is in-phase with respect to an auxiliary magnetic field generated by the feeding auxiliary coil, or out-of-phase with respect to the auxiliary magnetic field.

3. The apparatus of claim 1, wherein the feeding coil and the feeding auxiliary coil are in close contact with each other in a physically insulated state and wound along with the same center.

4. The apparatus of claim 3, wherein the feeding coil and the feeding auxiliary coil are positioned at a same plane, and have different radii for each number of times the feeding coil and the feeding auxiliary coil wound with the same center in the same plane.

5. The apparatus of claim 3, wherein the feeding coil and the feeding auxiliary coil are positioned at a different plane, and have the same radius for each number of turns with the same center in the different plane.

6. The apparatus of claim 1, further comprising:

a feeding shielding coil configured to be wound a plurality of times with the same center in a state spaced apart from an outer portion of the structure formed by the feeding coil and the feeding auxiliary coil, and generate a magnetic field with out-of-phase with respect to an auxiliary magnetic field generated by the feeding auxiliary coil, which causes of shielding a leakage magnetic field.

7. The apparatus of claim 1, wherein an effective inductance generated by the interaction between the feeding coil and the feeding auxiliary coil varies as at least one of a capacitance of the feeding coil and a capacitance of the feeding auxiliary coil is adjusted.

8. A wireless power reception apparatus comprising:

a collecting coil configured to be wound a plurality of times with respect to a center and receive electrical energy wirelessly through magnetic inductive coupling when exposed to a time-varying magnetic field generated by a feeding coil according to operating frequency of a supply power; and a collecting auxiliary coil configured to be wound along with the collecting coil a plurality of times with respect to the same center as the collecting coil, generate an auxiliary magnetic field with a phase that affects the collecting coil, and provide additional inductance generated by the auxiliary magnetic field, wherein the additional inductance increases as a ratio of a current flowing to the collecting auxiliary coil to a current flowing in the collecting coil becomes greater, and wherein the collecting coil and the collecting auxiliary coil are not directly electrically connected to each other, and a current flows in the collecting auxiliary coil by magnetic induction from the collecting coil.

9. The apparatus of claim 8, wherein a magnetic field generated by the collecting coil is in-phase with respect to an auxiliary magnetic field generated by the collecting auxiliary coil, or out-of-phase with respect to the auxiliary magnetic field.

10. The apparatus of claim 8, wherein the collecting coil and the collecting auxiliary coil are in close contact with each other in a physically insulated state and wound along with the same center.

11. The apparatus of claim 10, wherein the collecting coil and the collecting auxiliary coil are positioned at a same plane, and have different radii for each number of times the collecting coil and the collecting auxiliary coil are wound with the same center in the same plane.

12. The apparatus of claim 10, wherein the collecting coil and the collecting auxiliary coil are positioned at a different plane, and have the same radius for each number of times they are wound around the same center in the different plane.

13. The apparatus of claim 8, further comprising:

a current collecting shielding coil configured to be wound a plurality of times with the same center in a state spaced apart from an outer portion of a structure formed by the collecting coil and the current collecting auxiliary coil, and generate a magnetic field having an out-of-phase with respect to an auxiliary magnetic field generated by the collecting auxiliary coil, which causes of shielding a leakage magnetic field.

14. The apparatus of claim 8, wherein an effective inductance generated by the interaction between the collecting coil and the collecting auxiliary coil varies as at least one of a capacitance of the collecting coil and a capacitance of the collecting auxiliary coil is adjusted.

15. A wireless power transmission system comprising:

a feeding apparatus configured to wirelessly transmit an electrical energy through magnetic inductive coupling; and a current collecting apparatus configured to receive the electrical energy wirelessly through the magnetic inductive coupling, wherein the feeding apparatus comprises:

a feeding coil is configured to be wound a plurality of times with respect to a center, generate a time-varying magnetic field according to operating frequency of a supply power, and wirelessly transmit an electrical energy to a collecting coil exposed to the time-varying magnetic field through magnetic inductive coupling; and a feeding auxiliary coil configured to be wound along with the feeding coil a plurality of times with respect to the same center as the feeding coil, generate an auxiliary magnetic field with a phase that affects the feeding coil, and provide additional inductance generated by the auxiliary magnetic field, and wherein the current collecting apparatus comprises:

a collecting coil configured to be wound a plurality of times with respect to a center and receives electrical energy wirelessly through magnetic inductive coupling when exposed to a time-varying magnetic field generated by a feeding coil according to operating frequency of a supply power; and a collecting auxiliary coil configured to be wound along with the collecting coil a plurality of times with respect to the same center as the collecting coil, generate a auxiliary magnetic field with a phase that affects the collecting coil, and provide additional inductance generated by the auxiliary magnetic field.

* * * * *